(12) United States Patent
Gally et al.

(10) Patent No.: US 7,928,928 B2
(45) Date of Patent: Apr. 19, 2011

(54) APPARATUS AND METHOD FOR REDUCING PERCEIVED COLOR SHIFT

(75) Inventors: Brian J. Gally, San Rafael, CA (US); Manish Kothari, Cupertino, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 960 days.

(21) Appl. No.: 11/077,974

(22) Filed: Mar. 11, 2005

(65) Prior Publication Data

US 2006/0077122 A1    Apr. 13, 2006

Related U.S. Application Data

(60) Provisional application No. 60/613,297, filed on Sep. 27, 2004.

(51) Int. Cl.
*G09G 3/00* (2006.01)
(52) U.S. Cl. .......................... 345/32; 345/82; 359/291
(58) Field of Classification Search ............ 345/76–83, 345/204, 32; 359/291
See application file for complete search history.

(56) References Cited

U.S. PATENT DOCUMENTS

| | | | |
|---|---|---|---|
| 2,677,714 A | 5/1954 | Max | |
| 3,247,392 A | 4/1966 | Thelen | |
| 3,448,334 A | 6/1969 | Frost | |
| 3,653,741 A | 4/1972 | Marks | |
| 4,200,472 A | 4/1980 | Chappell | |
| 4,377,324 A | 3/1983 | Durand et al. | |
| 4,389,096 A | 6/1983 | Hori et al. | |
| 4,400,577 A | 8/1983 | Spear | |
| 4,441,789 A | 4/1984 | Pohlack | |
| 4,441,791 A | 4/1984 | Hornbeck | |
| 4,633,031 A | 12/1986 | Todorof | |
| 4,980,775 A * | 12/1990 | Brody | 348/383 |
| 4,982,184 A | 1/1991 | Kirkwood | |
| 5,022,745 A | 6/1991 | Zahowski et al. | |
| 5,044,736 A | 9/1991 | Jaskie et al. | |
| 5,142,414 A | 8/1992 | Koehler | |
| 5,164,858 A | 11/1992 | Aguilera, Jr. et al. | |
| 5,192,946 A | 3/1993 | Thompson et al. | |
| 5,233,385 A | 8/1993 | Sampsell | |

(Continued)

FOREIGN PATENT DOCUMENTS

CN    1517743    8/2004

(Continued)

OTHER PUBLICATIONS

European Search Report for European Patent Application No. 05255646.1 dated Feb. 6, 2007.

(Continued)

*Primary Examiner* — Kimnhung Nguyen
(74) *Attorney, Agent, or Firm* — Knobbe Martens Olson & Bear LLP

(57) ABSTRACT

An apparatus and method for reducing perceived color shift as a function of viewing angle is disclosed. One embodiment is a display device that includes a color light modulator and a color filter. The filter is configured to filter wavelengths of light that would be perceived as color shifted light when reflected by the modulator at an off-axis viewing angle. Another embodiment includes a color light modulator and a color light source configured to provide light having a spectral content that lacks the wavelengths that would be perceived as color shifted light by a view of the display at an off-axis viewing angle. Another embodiment are methods of making such display devices.

80 Claims, 12 Drawing Sheets

U.S. PATENT DOCUMENTS

| | | |
|---|---|---|
| 5,287,215 A | 2/1994 | Warde et al. |
| 5,345,322 A | 9/1994 | Fergason et al. |
| 5,356,488 A | 10/1994 | Hezel |
| 5,365,283 A | 11/1994 | Doherty et al. |
| 5,398,170 A * | 3/1995 | Lee ............................. 362/559 |
| 5,448,314 A | 9/1995 | Heimbuch et al. |
| 5,517,347 A | 5/1996 | Sampsell |
| 5,619,059 A | 4/1997 | Li et al. |
| 5,619,365 A | 4/1997 | Rhoads et al. |
| 5,619,366 A | 4/1997 | Rhoads et al. |
| 5,633,739 A | 5/1997 | Matsuyama |
| 5,710,656 A | 1/1998 | Goossen |
| 5,739,945 A | 4/1998 | Tayebati |
| 5,745,281 A | 4/1998 | Yi |
| 5,754,260 A | 5/1998 | Ooi |
| 5,805,117 A | 9/1998 | Mazurek |
| 5,815,229 A | 9/1998 | Shapiro et al. |
| 5,835,255 A | 11/1998 | Miles |
| 5,853,310 A | 12/1998 | Nishimura |
| 5,868,480 A * | 2/1999 | Zeinali ............................. 353/31 |
| 5,886,688 A | 3/1999 | Fifield |
| 5,892,598 A | 4/1999 | Asakawa et al. |
| 5,914,804 A | 6/1999 | Goossen |
| 5,933,183 A | 8/1999 | Enomoto |
| 5,959,763 A | 9/1999 | Bozler et al. |
| 5,986,796 A | 11/1999 | Miles et al. |
| 5,991,073 A | 11/1999 | Woodgate et al. |
| 6,028,690 A | 2/2000 | Carter et al. |
| 6,031,653 A | 2/2000 | Wang |
| 6,040,937 A | 3/2000 | Miles |
| 6,046,840 A | 4/2000 | Huibers |
| 6,055,090 A | 4/2000 | Miles |
| 6,088,102 A | 7/2000 | Manhart |
| 6,113,239 A | 9/2000 | Sampsell et al. |
| 6,195,196 B1 | 2/2001 | Kimura et al. |
| 6,201,633 B1 | 3/2001 | Peeters et al. |
| 6,243,149 B1 | 6/2001 | Swanson et al. |
| 6,282,010 B1 | 8/2001 | Sulzbach |
| 6,285,424 B1 | 9/2001 | Yoshida |
| 6,288,824 B1 | 9/2001 | Kastalsky |
| 6,300,558 B1 | 10/2001 | Takamoto |
| 6,301,000 B1 | 10/2001 | Johnson |
| 6,342,970 B1 | 1/2002 | Sperger et al. |
| 6,356,378 B1 | 3/2002 | Huibers |
| 6,381,022 B1 | 4/2002 | Zavracky |
| 6,400,738 B1 | 6/2002 | Tucker |
| 6,466,358 B2 | 10/2002 | Tew |
| 6,483,613 B1 | 11/2002 | Woodgate et al. |
| 6,549,338 B1 | 4/2003 | Wolverton et al. |
| 6,574,033 B1 | 6/2003 | Chui |
| 6,597,419 B1 | 7/2003 | Okada et al. |
| 6,597,490 B2 | 7/2003 | Tayebati |
| 6,636,322 B1 | 10/2003 | Terashita |
| 6,643,069 B2 | 11/2003 | Dewald |
| 6,650,455 B2 | 11/2003 | Miles |
| 6,674,562 B1 | 1/2004 | Miles |
| 6,680,792 B2 | 1/2004 | Miles |
| 6,738,194 B1 | 5/2004 | Ramirez et al. |
| 6,760,146 B2 | 7/2004 | Ikeda et al. |
| 6,768,555 B2 | 7/2004 | Chen et al. |
| 6,773,126 B1 | 8/2004 | Hatjasalo et al. |
| 6,811,267 B1 | 11/2004 | Allen et al. |
| 6,822,780 B1 | 11/2004 | Long |
| 6,841,787 B2 | 1/2005 | Almogy |
| 6,867,896 B2 | 3/2005 | Miles |
| 6,870,581 B2 | 3/2005 | Li et al. |
| 6,882,458 B2 | 4/2005 | Lin et al. |
| 6,912,022 B2 | 6/2005 | Lin |
| 6,930,816 B2 | 8/2005 | Mochizuki |
| 6,967,779 B2 | 11/2005 | Fadel et al. |
| 6,982,820 B2 | 1/2006 | Tsai |
| 6,995,890 B2 | 2/2006 | Lin |
| 6,999,225 B2 | 2/2006 | Lin |
| 6,999,236 B2 | 2/2006 | Lin |
| 7,002,726 B2 | 2/2006 | Patel |
| 7,006,272 B2 | 2/2006 | Tsai |
| 7,009,754 B2 | 3/2006 | Huibers |
| 7,016,095 B2 | 3/2006 | Lin |
| 7,034,981 B2 | 4/2006 | Makigaki |
| 7,038,752 B2 | 5/2006 | Lin |
| 7,072,093 B2 | 7/2006 | Piehl |
| 7,072,096 B2 | 7/2006 | Holman et al. |
| 7,110,158 B2 | 9/2006 | Miles |
| 7,113,339 B2 | 9/2006 | Taguchi et al. |
| 7,123,216 B1 | 10/2006 | Miles |
| 7,126,738 B2 | 10/2006 | Miles |
| 7,138,984 B1 | 11/2006 | Miles |
| 7,142,347 B2 | 11/2006 | Islam |
| 7,161,728 B2 | 1/2007 | Sampsell et al. |
| 7,161,730 B2 | 1/2007 | Floyd |
| 7,172,915 B2 | 2/2007 | Lin |
| 7,187,489 B2 | 3/2007 | Miles |
| 7,218,429 B2 | 5/2007 | Batchko |
| 7,304,784 B2 | 12/2007 | Chui |
| 7,342,705 B2 | 3/2008 | Chui et al. |
| 7,342,709 B2 | 3/2008 | Lin |
| 7,372,449 B2 * | 5/2008 | Kodama et al. ............... 345/108 |
| 7,385,748 B2 | 6/2008 | Miles |
| 7,603,001 B2 | 10/2009 | Wang et al. |
| 7,701,029 B2 | 4/2010 | Mabuchi |
| 7,710,632 B2 | 5/2010 | Cummings |
| 7,719,500 B2 | 5/2010 | Chui |
| 7,750,886 B2 | 7/2010 | Sampsell |
| 7,807,488 B2 | 10/2010 | Gally |
| 7,855,824 B2 | 12/2010 | Gally |
| 2001/0049061 A1 | 12/2001 | Nakagaki |
| 2001/0055208 A1 | 12/2001 | Kimura |
| 2002/0015215 A1 | 2/2002 | Miles |
| 2002/0024711 A1 | 2/2002 | Miles |
| 2002/0075555 A1 | 6/2002 | Miles |
| 2002/0080465 A1 | 6/2002 | Han |
| 2002/0126364 A1 | 9/2002 | Miles |
| 2002/0167730 A1 | 11/2002 | Needham et al. |
| 2003/0006730 A1 | 1/2003 | Tachibana |
| 2003/0011864 A1 | 1/2003 | Flanders |
| 2003/0072070 A1 | 4/2003 | Miles |
| 2003/0107692 A1 | 6/2003 | Sekiguchi |
| 2003/0151821 A1 | 8/2003 | Favalora |
| 2003/0160919 A1 | 8/2003 | Suzuki et al. |
| 2003/0161040 A1 | 8/2003 | Ishii |
| 2003/0169385 A1 | 9/2003 | Okuwaki |
| 2003/0179383 A1 | 9/2003 | Chen et al. |
| 2003/0206281 A1 | 11/2003 | Jain |
| 2003/0210363 A1 | 11/2003 | Yasukawa |
| 2003/0213514 A1 | 11/2003 | Ortabasi |
| 2003/0214621 A1 | 11/2003 | Kim |
| 2004/0027315 A1 | 2/2004 | Senda et al. |
| 2004/0051929 A1 | 3/2004 | Sampsell |
| 2004/0066477 A1 | 4/2004 | Morimoto |
| 2004/0070711 A1 | 4/2004 | Wen et al. |
| 2004/0080938 A1 | 4/2004 | Holman et al. |
| 2004/0115339 A1 | 6/2004 | Ito |
| 2004/0125048 A1 | 7/2004 | Fukuda et al. |
| 2004/0125281 A1 | 7/2004 | Lin |
| 2004/0174583 A1 | 9/2004 | Chen et al. |
| 2004/0188599 A1 | 9/2004 | Viktorovitch et al. |
| 2004/0217919 A1 | 11/2004 | Piehl et al. |
| 2004/0218251 A1 | 11/2004 | Piehl et al. |
| 2005/0024557 A1 | 2/2005 | Lin |
| 2005/0036095 A1 | 2/2005 | Yeh et al. |
| 2005/0042117 A1 | 2/2005 | Lin |
| 2005/0057442 A1 | 3/2005 | Way |
| 2005/0069209 A1 | 3/2005 | Damera-Venkata et al. |
| 2005/0117623 A1 | 6/2005 | Shchukin |
| 2005/0195462 A1 | 9/2005 | Lin |
| 2005/0212738 A1 | 9/2005 | Gally |
| 2006/0022966 A1 * | 2/2006 | Mar ............................. 345/204 |
| 2006/0066541 A1 | 3/2006 | Gally |
| 2006/0066783 A1 | 3/2006 | Sampsell |
| 2006/0066935 A1 | 3/2006 | Cummings et al. |
| 2006/0067600 A1 | 3/2006 | Gally |
| 2006/0067633 A1 | 3/2006 | Gally |
| 2006/0077124 A1 | 4/2006 | Gally |
| 2006/0077127 A1 | 4/2006 | Sampsell |
| 2006/0077149 A1 | 4/2006 | Gally |
| 2006/0077512 A1 | 4/2006 | Cummings |
| 2006/0103912 A1 | 5/2006 | Katoh |

| | | | |
|---|---|---|---|
| 2006/0130889 A1 | 6/2006 | Li et al. | |
| 2006/0180886 A1 | 8/2006 | Tsang | |
| 2006/0201546 A1 | 9/2006 | Yokoyama | |
| 2006/0274243 A1* | 12/2006 | Iijima et al. | 349/114 |
| 2006/0274400 A1 | 12/2006 | Miles | |
| 2006/0286381 A1 | 12/2006 | Naito | |
| 2007/0064446 A1 | 3/2007 | Sharma et al. | |
| 2007/0115415 A1 | 5/2007 | Piehl | |
| 2007/0196040 A1 | 8/2007 | Wang | |
| 2007/0206267 A1 | 9/2007 | Tung | |
| 2007/0247704 A1 | 10/2007 | Mignard | |
| 2008/0095997 A1 | 4/2008 | Chiang et al. | |
| 2008/0112039 A1 | 5/2008 | Chui | |
| 2008/0151347 A1 | 6/2008 | Chui | |
| 2009/0073540 A1 | 3/2009 | Kothari | |
| 2009/0086301 A1 | 4/2009 | Gally | |
| 2009/0101192 A1 | 4/2009 | Kothari | |
| 2009/0151771 A1 | 6/2009 | Kothari | |
| 2009/0231524 A1 | 9/2009 | Tanaka | |
| 2009/0242024 A1 | 10/2009 | Kothari | |
| 2009/0293955 A1 | 12/2009 | Kothari | |
| 2010/0096006 A1 | 4/2010 | Griffiths | |
| 2010/0096011 A1 | 4/2010 | Griffiths | |
| 2010/0245370 A1 | 9/2010 | Narayanan | |
| 2010/0245975 A1 | 9/2010 | Cummings | |

FOREIGN PATENT DOCUMENTS

| | | |
|---|---|---|
| DE | 196 22 748 | 12/1997 |
| DE | 103 29 917 A1 | 2/2005 |
| EP | 0 223 136 A | 5/1987 |
| EP | 0 786 911 | 7/1997 |
| EP | 0 822 441 | 2/1998 |
| EP | 0 830 032 | 3/1998 |
| EP | 0 855 745 | 7/1998 |
| EP | 1003062 A1 | 5/2000 |
| EP | 1 014 161 | 6/2000 |
| EP | 1 251 454 | 10/2002 |
| EP | 1 336 876 | 8/2003 |
| EP | 1 341 025 | 9/2003 |
| EP | 1 389 775 | 2/2004 |
| EP | 1 413 543 | 4/2004 |
| EP | 1 640 767 | 3/2006 |
| EP | 1 670 065 A | 6/2006 |
| GB | 2 278 222 | 11/1994 |
| GB | 2 315 356 | 1/1998 |
| GB | 2 321 532 | 7/1998 |
| JP | 02 068513 | 3/1990 |
| JP | 02-151079 A | 6/1990 |
| JP | 04 081816 | 3/1992 |
| JP | 04-238321 A | 8/1992 |
| JP | 08 018990 | 1/1996 |
| JP | 09 189869 | 7/1997 |
| JP | 09-189910 | 7/1997 |
| JP | 09 281917 | 10/1997 |
| JP | 11 002712 | 1/1999 |
| JP | 11 174234 | 7/1999 |
| JP | 11 211999 | 8/1999 |
| JP | 11-295726 A | 10/1999 |
| JP | 2000-514568 | 10/2000 |
| JP | 2001 343514 | 12/2001 |
| JP | 2001-345458 | 12/2001 |
| JP | 2002 062505 | 2/2002 |
| JP | 2002 174780 | 6/2002 |
| JP | 2002-229023 | 8/2002 |
| JP | 2002 287047 | 10/2002 |
| JP | 2003-021821 A | 1/2003 |
| JP | 2004-111278 | 4/2004 |
| JP | 2004-206049 | 7/2004 |
| JP | 2004-212673 | 7/2004 |
| JP | 2004-212922 | 7/2004 |
| JP | 2005-308871 | 11/2005 |
| JP | 2008-224930 A | 9/2008 |
| KR | 2002/010322 | 2/2002 |
| KR | 2003-0081662 A | 10/2003 |
| TW | 594155 | 6/2004 |
| WO | WO 95/30924 | 11/1995 |
| WO | WO 96/08833 | 3/1996 |
| WO | WO 97/17628 | 5/1997 |
| WO | WO 97/44707 A | 11/1997 |
| WO | WO 99/67680 | 12/1999 |
| WO | WO 01/81994 | 11/2001 |
| WO | WO 02/24570 A1 | 3/2002 |
| WO | WO 02/071132 | 9/2002 |
| WO | WO 03/007049 | 1/2003 |
| WO | WO 03/007049 A1 | 1/2003 |
| WO | WO 03/056876 | 7/2003 |
| WO | WO 03/073151 | 9/2003 |
| WO | WO 2004/006003 | 1/2004 |
| WO | WO 2005/076051 | 8/2005 |
| WO | WO 2006/036519 | 4/2006 |
| WO | WO 2006/036540 | 4/2006 |
| WO | WO 2006/036564 | 4/2006 |
| WO | WO 2007/127046 | 11/2007 |
| WO | WO 2007/142978 A2 | 12/2007 |

OTHER PUBLICATIONS

Hohlfeld, et al. "Micro-Machined Tunable Optical Filters with Optimized Band-Pass Spectrum." 12th International Conference on Transducers, Solid State Sensors, Actuators and Microsystems; vol. 2, Jun. 8-12, 2003. pp. 1494-1497.

Mehregany, et al. "MEMS Application in Optical Systems." IEEE/LEOS 1996 Summer Topical Meetings; Aug. 5-9, 1996. pp. 75-76.

Austrian Search Report dated Jul. 14, 2005.

Office Action in Chinese Application No. 200510105051.1 dated Mar. 28, 2008.

Office Action in Chinese Application No. 200510105051.1 dated Dec. 19, 2008.

Office Action in European Application No. 05255646.1 dated Oct. 12, 2007.

Office Action in Japanese Application No. 2005-260607 dated Sep. 30, 2008.

Aratani K. et. al.,"Surface Micromachined Tuneable Interferometer Array," Sensors and Actuators A, vol. A43, No. 1/3, pp. 17-23, May 1994.

ISR and WO dated Jun. 8, 2005 in International Patent Application No. PCT/US2005/002986 (International Publication No. WO 2006/076051).

Austrian Search Report in U.S. Appl. No. 11/036,965 dated Jul. 25, 2005.

International Search Report and Written Opinion in PCT/US2005/032335 (International Publication No. WO 2006/036519) dated Dec. 30, 2005.

Extended European Search Report in App. No. 05255657.8 (Publication No. EP 1640767) dated Dec. 7, 2005.

Austrian Search Report in U.S. Appl. No. 11/051,258 dated May 13, 2005.

International Search Report and Written Opinion in PCT/US2007/008790(International Publication No. WO 2007/127046) dated Nov. 2, 2007.

Office Action in U.S. Appl. No. 11/051,258 mailed Nov. 22, 2006.

Amendment to Office Action in U.S. Appl. No. 11/051,258 dated Feb. 22, 2007.

Office Action in U.S. Appl. No. 11/051,258 mailed May 18, 2007.

RCE and Response to Office Action in U.S. Appl. No. 11/051,258 dated Aug. 17, 2007.

Interview Summary in U.S. Appl. No. 11/051,258 mailed Aug. 23, 2007.

Supplemental Amendment in U.S. Appl. No. 11/051,258 dated Oct. 10, 2007.

Office Action in U.S. Appl. No. 11/051,258 mailed Jan. 3, 2008.

Interview Summary in U.S. Appl. No. 11/051,258 mailed Apr. 18, 2008.

Amendment and Response in U.S. Appl. No. 11/051,258 dated May 5, 2008.

Notice of Allowance U.S. Appl. No. 11/051,258 mailed Jun. 17, 2008.

RCE in U.S. Appl. No. 11/051,258 dated Sep. 16, 2008.

Notice of Allowance in U.S. Appl. No. 11/051,258 mailed Oct. 10, 2008.

RCE in U.S. Appl. No. 11/051,258 dated Jan. 8, 2009.

Office Action in U.S. Appl. No. 11/051,258 mailed Feb. 3, 2009.

Interview Summary in U.S. Appl. No. 11/051,258 mailed Feb. 18, 2009.
Office Communication from the USPTO for Application No. 11/036,965 dated Mar. 28, 2006.
Amendment in Reply to Office Communication from the USPTO for Application No. 11/036,965 dated Jun. 27, 2006.
Office Communication from the USPTO for Application No. 11/036,965 dated Jan. 30, 2007.
Amendment in Reply to Office Communication from the USPTO for Application No. 11/036,965 dated Jun. 29, 2007.
Notice of Allowance from the USPTO for U.S. Appl. No. 11/036,965 dated Sep. 11, 2007.
Office Communication from the USPTO for U.S. Appl. No. 12/034,499 dated Jul. 9, 2008.
Amendment and Response in U.S. Appl. No. 12/034,499 dated Oct. 8, 2008.
Office Communication from the USPTO for U.S. Appl. No. 12/034,499 dated Jan. 26, 2009.
Office Communication from the USPTO for U.S. Appl. No. 12/014,657 dated Aug. 21, 2008.
Amendment and Response in U.S. Appl. No. 12/014,657 dated Nov. 21, 2008.
Office Communication from the USPTO for U.S. Appl. No. 12/014,657 dated Mar. 5, 2009.
Official Communication in Chinese App. No. 200580003812.0 dated Mar. 7, 2008.
Translation of the Official Communication in Russian App. No. 2006131568/28 mailed Feb. 2009.
Office Communication from the USPTO for U.S. Appl. No. 11/408,753 dated Dec. 22, 2006.
Amendment in Reply to Office Communication from the USPTO for U.S. Appl. No. 11/408,753 dated Apr. 18, 2007.
Office Communication from the USPTO for U.S. Appl. No. 11/408,753 dated Jul. 3, 2007.
RCE and Amendment in U.S. Appl. No. 11/408,753 dated Jan. 2, 2008.
Office Action dated Mar. 20, 2008 in U.S. Appl. No. 11/408,753.
Amendment in U.S. Appl. No. 11/408,753 dated Jun. 20, 2008.
Notice of Allowance in Appl. No. 11/408,753 dated Sep. 16, 2008.
RCE in Appl. No. 11/408,753 dated Dec. 15, 2008.
Notice of Allowance in Application No. 11/408,753 dated Jan. 9, 2009.
RCE in U.S. Appl. No. 11/408,753 dated Apr. 7, 2009.
Office Communication from the USPTO for U.S. Appl. No. 10/249,244 dated Sep. 29, 2004.
Amendment in Reply to Office Communication from the USPTO for U.S. Appl. No. 10/249,244 dated Nov. 15, 2004.
Notice of Allowance from the USPTO for U.S. Appl. No. 10/249,244 dated Jan. 26, 2005.
Official Communication in Japanese App. No. 2003-136787 mailed Nov. 14, 2006.
Office Communication from the USPTO for U.S. Appl. No. 11/208,085 dated Dec. 10, 2008.
Official Communication in U.S. Appl. No. 12/014,657 dated Oct. 15, 2009.
Official Communication in Japanese App. No. 2006-552191 dated Sep. 8, 2009.
Conner, "Hybrid Color Display Using Optical Interference Filter Array," SID Digest, pp. 577-580 (1993).
Fan et al., "Channel Drop Filters in Photonic Crystals", Optics Express, vol. 3, No. 1, 1998.
Giles et al., "Silicon MEMS Optical Switch Attenuator and Its Use in Lightwave Subsystems", IEEE Journal of Selected Topics in Quanum Electronics, vol. 5. No. 1, Jan./Feb. 1999,pp. 18-25.
Huang, et al., "Multidirectional Asymmetrical Microlens-Array Light Control Films for High Performance Reflective Liquid Crystal Displays", SID Digest, 2002, pp. 870-873.
Jerman et al., "A Miniature Fabry-Perot Interferometer Fabricated Using Silicon Micromaching Techniques," IEEE Electron Devices Society (1988).
Jerman et al., "A Miniature Fabry-Perot Interferometer with a Corrugated Silicon Diaphragm Support", (1990).
Little et al., "Vertically Coupled Microring Rosonator Channel Dropping Filter", IEEE Photonics Technology Letters, vol. 11, No. 2, 1999.
Magel, "Integrated Optic Devices Using Micromachined Metal Membranes", SPIE vol. 2686, 0-8194-2060-3/1996.
Mehregany et al., "MEMS Applications in Optical Systems", IEEE/LEOS 1996 Summer Topical Meetings, pp. 75-76, (Aug. 5-9, 1996).
Miles, Mark, W., "A New Reflective FPD Technology Using Interferometric Modulation", The Proceedings of the Society for Information Display (May 11-16, 1997).
Miles, M.W., "A Mems Based Interferometric Modulator (IMOD) for Display Applications," Proceedings of Sensors Expo, pp. 281-284, Oct. 21, 1997.
Miles, "Interferometric Modulation: MOEMS as an enabling technology for high-performance reflective displays," Proceedings of the SPIE, 4985:28, pp. 131-139, Jan. 2003.
Raley et al., "A Fabry-Perot Microinterferometer for Visible Wavelengths," IEEE Solid-State Sensor and Actuator Workshop, Hilton Head, SC, pp. 170-173 (1992).
Sperger et al., "High Performance Patterned All-Dielectric Interference Colour Filter for Display Applications", SID Digest, pp. 81-83, (1994).
Walker, et al., "Electron-beam-tunable Interference Filter Spatial Light Modulator", Optics Letters vol. 13, No. 5, pp. 345-347, (May 1988).
Wu, "Design of a Reflective Color LCD Using Optical Interference Reflectors", ASIA Display '95, pp. 929-931, (Oct. 1995).
Official Communication in Mexican Patent Application No. PA/a/2005/010242 mailed Apr. 17, 2008.
International Search Report and Written Opinion in PCT/US2005/032633; International Publication No. WO 2006/036540) dated Feb. 6, 2006.
International Search Report and Written Opinion in PCT/US2005/032886; (International Publication No. WO 2006/036564) dated Mar. 30, 2006.
Amendment in U.S. Appl. No. 11/051,258 dated May 9, 2009.
Notice of Allowance in U.S. Appl. No. 11/051,258 dated Jul. 13, 2009.
Official Communication in Chinese Application No. 2005101035579 dated May 9, 2008.
Official Communication in European Application No. 05255657.8 dated Oct. 12, 2006.
Official Communication in Japanese Application No. 2005-235802 mailed Sep. 9, 2008.
Official Communication in Mexican Application No. PA/a/2005/009406 dated May 6, 2008.
Amendment and RCE in U.S. Appl. No. 12/034,499 dated Apr. 27, 2009.
Official Communication in U.S. Appl. No. 12/034,499 dated Jul. 16, 2009.
Amendment in U.S. Appl. No. 12/014,657 dated Jun. 5, 2009.
RCE and IDS in U.S. Appl. No. 11/408,753 (QCO.186A) dated Jul. 21, 2009.
Preliminary Amendment in U.S. Appl. No. 11/408,753 (QCO.186A) dated Jul. 31, 2009.
Notice of Allowance in U.S. Appl. No. 11/408,753 (QCO.186A) dated Aug. 3, 2009.
Supplemental Notice of Allowability in U.S. Appl. No. 11/408,753 (QCO.186A) dated Sep. 3, 2009.
Interview Summary in U.S. Appl. No. 11/408,753 (QCO.186A) dated Sep. 10, 2009.
Amendment and Response in U.S. Appl. No. 11/208,085 (QCO.167A1) dated Jun. 8, 2009.
Notice of Allowance in U.S. Appl. No. 11/208,085 (QCO.167A1) dated Sep. 14, 2009.
Petschick et al: "Fabry-Pérot-Interferometer", Nov. 15, 2002. Retrieved from the Internet URL:http://pl.physik.tuberlin.de/groups/pg279/protokolless02/04_fpi.pdf> on Apr. 14, 2009.
Office Action in European Application No. 05255646.1 dated Apr. 27, 2009.
American Institute of Physics Handbook, "Glass Polarizing and Interference Filters," pp. 6-172-6-178, 1982.

Demiryont et al., "Innovative Transparent Electrode for Flexible Displays," Defense, Security, Cockpit and Future Display II, Proc. Of SPIE vol. 6225, 622519, Apr. 2006.

Lin et al., "Development of UV Stable LED Encapsulants," Microsystems, Packaging, Assembly and Circuits Technology Conference, 2009, IMPACT 2009, 4th International, Publication Year: 2009, pp. 565-567.

Shane Dewitt, "Integrating Touch Screens and Optical Films: When, Where, and How?" 3M Touch Systems, Society for Information Display, Americas Display Engineering & Applications Conference, Oct. 24-27, 2005, Portland, Oregon U.S.A.

Office Action in Chinese Application No. 200510105051.1 dated Jan. 8, 2010.

Office Action in Japanese Application No. 2005-260607 dated Nov. 10, 2009.

Application Initiated Interview Request in U.S. Appl. No. 12/034,499, dated Oct. 22, 2009.

Examiner Interview Summary in U.S. Appl. No. 12/034,499, dated Oct. 29, 2009.

Amendment and Application Summary of Interview with Examiner in U.S. Appl. No. 12/034,499, dated Dec. 16, 2009.

Office Action in U.S. Appl. No. 12/034,499, dated Apr. 1, 2010.

Examiner Interview Summary in Application No. 12/034,499, dated Jun. 9, 2010.

Amendment in U.S. Appl. No. 12/014,657, dated Feb. 16, 2010.

Office Action in U.S. Appl. No. 12/014,657, dated May 28, 2010.

Official Communication in European Application No. 05 712 433, dated Mar. 9, 2010.

Office Action in Japanese Application No. 2006-552191 dated Mar. 30, 2010.

Official Communication in Vietnamese Application No. 1-2006-01453, dated Dec. 16, 2009.

Official Communication in Taiwanese Application No. 094103300, dated Mar. 26, 2010.

Examiner Interview Summary in U.S. Appl. No. 11/408,753, dated Sep. 10, 2009.

Amendment in U.S. Appl. No. 11/408,753, dated Oct. 2, 2009.

Request for Continued Examination and IDS in U.S. Appl. No. 11/408,753, dated Nov. 2, 2009.

Notice of Allowance in U.S. Appl. No. 11/408,753, dated Nov. 6, 2009.

Preliminary Amendment and IDS in U.S. Appl. No. 11/408,753, dated Nov. 6, 2009.

Examiner Interview Summary in U.S. Appl. No. 11/408,753, dated Nov. 19, 2009.

Request for Continued Examination, Amendment, Information Disclosure Statement, and Interview Summary in U.S. Appl. No. 11/408,753, dated Feb. 5, 2010.

Examiner Interview Summary in U.S. Appl. No. 11/408,753, dated Feb. 22, 2010.

Notice of Allowance in U.S. Appl. No. 11/408,753, dated Mar. 8, 2010.

Interview Summary in U.S. Appl. No. 11/408,753, dated Mar. 22, 2010.

Issue Fee Payment and Amendment After Allowance in U.S. Appl. No. 11/408,753, dated Jun. 7, 2010.

International Preliminary Report on Patentability in PCT/US2007/008790, dated Oct. 30, 2008.

Granted Petition to Withdraw from Issue in U.S. Appl. No. 11/208,085, dated May 27, 2010.

Request for Continued Examination, Amendment, and Petition to Withdraw from Issue in U.S. Appl. No. 11/208,085, dated May 25, 2010.

Response to Rule 312 Communication in U.S. Appl. No. 11/208,085, dated Apr. 15, 2010.

Amendment After Notice of Allowance and Issue Fee Payment in U.S. Appl. No. 11/208,085, dated Mar. 26, 2010.

Notice of Allowance in U.S. Appl. No. 11/208,085, dated Dec. 29, 2009.

Preliminary Amendment and Information Disclosure Statement in U.S. Appl. No. 11/208,085, dated Dec. 14, 2009.

Request for Continued Examination and Information Disclosure Statement in U.S. Appl. No. 11/208,085, dated Nov. 13, 2009.

International Preliminary Report on Patentability in PCT/US2005/032335, dated Apr. 5, 2007.

Issue Notification in U.S. Appl. No. 11/051,258, dated Nov. 11, 2009.

Request for Continued Examination, Petition to Withdraw from Issue, Information Disclosure Statement in U.S. Appl. No. 11/051,258, dated Nov. 24, 2009.

Petition to Withdraw from Issue Granted in U.S. Appl. No. 11/051,258, dated Nov. 25, 2009.

Notice of Allowance in U.S. Appl. No. 11/051,258, dated Dec. 17, 2009.

Official Communication in European Application No. 05 255 657, dated Mar. 8, 2010.

Official Communication in Japanese Application No. 2005-235802, dated Nov. 10, 2009.

Request for Continued Examination and Amendment in U.S. Appl. No. 12/034,499, dated Jul. 1, 2010.

Notice of Allowance in U.S. Appl. No. 12/034,499, dated Sep. 3, 2010.

Request for Continued Examination and Amendment in U.S. Appl. No. 12/014,657, dated Aug. 30, 2010.

Official Communication in Mexican Application No. PA/a/2006/008719 dated Aug. 12, 2008.

Notice of Allowance in U.S. Appl. No. 11/208,085, dated Jul. 6, 2010.

Request for Continued Examination and Information Disclosure Statement in U.S. Appl. No. 11/208,085, dated Oct. 5, 2010.

Preliminary Amendment in U.S. Appl. No. 11/208,085, dated Oct. 8, 2010.

Official Communication in Japanese Application No. 2007-533524, dated Jun. 8, 2010.

Notice of Allowance in U.S. Appl. No. 11/408,753 dated Apr. 24, 2009.

Official Communication in U.S. Appl. No. 11/408,753; Publication No. US2007-0247704A1) dated Oct. 8, 2009.

Response to Rule 312 Communication in U.S. Appl. No. 11/408,753, dated Jun. 18, 2010.

Petition to Withdraw from Issue and Request for Continued Examination in U.S. Appl. No. 11/408,753, dated Aug. 6, 2010.

Granted Petition to Withdraw from Issue in U.S. Appl. No. 11/408,753, dated Aug. 9, 2010.

Amendment in U.S. Appl. No. 11/408,753, dated Aug. 16, 2010.

Notice of Allowance in U.S. Appl. No. 11/408,753, dated Aug. 27, 2010.

Examiner Interview Summary and Supplementary Notice of Allowance in U.S. Appl. No. 11/408,753, dated Oct. 8, 2010.

Nakagawa et al., "Wide-Field-of-View Narrow-Band Spectral Filters Based on Photonic Crystal Nanocavities", Optical Society of America, Optics Letters, vol. 27, No. 3, pp. 191-193, 2002.

Extended European Search Report in Application No. 10176512.1 dated Oct. 22, 2010.

Office Communication from the USPTO for U.S. Appl. No. 11/036,965 dated Sep. 18, 2006.

Amendment in Reply to Office Communication from the USPTO for U.S. Appl. No. 11/036,965 dated Oct. 17, 2006.

Official Communication in Chinese App. No. 201010140527.6, dated Oct. 12, 2010.

Office Action in Japanese Application No. 2006-552191, dated Oct. 22, 2010.

Notice of Allowance in U.S. Appl. No. 11/208,085, dated Oct. 29, 2010.

Office Action in U.S. Appl. No. 11/208,167 dated Oct. 23, 2008.

Amendment to Office Action in U.S. Appl. No. 11/208,167 dated Jan. 23, 2009.

Office Action in U.S. Appl. No. 11/208,167; (Publication No. US2006/0066641A1), dated May 13, 2009.

Amendment and Response in U.S. Appl. No. 11/208,167; (Publication No. US2006/0066641A1), dated Sep. 11, 2009.

Office Action in U.S. Appl. No. 11/208,167; (Publication No. US2006/0066641A1), dated Oct. 7, 2009.

Amendment and Response in U.S. Appl. No. 11/208,167; (Publication No. US2006/0066641A1), dated Feb. 10, 2010.

Office Action in U.S. Appl. No. 11/208,167; (Publication No. US2006/0066641A1), dated Apr. 15, 2010.

Examiner Interview Summary in U.S. Appl. No. 11/208,167; (Publication No. US2006/0066641A1), dated Sep. 23, 2010.

Request for Continued Examination (RCE), Amendment, and Applicant Summary of Interview with Examiner in U.S. Appl. No. 11/208,167; (Publication No. US2006/0066641A1), dated Oct. 14, 2010.

Office Action in U.S. Appl. No. 11/208,167; (Publication No. US2006/0066641A1), dated Nov. 26, 2010.

Request for Continued Examination (RCE) and Information Disclosure Statement in U.S. Appl. No. 11/408,753; (Published No. US 2007/0247704 A1), dated Nov. 23, 2010.

Interview Summary in U.S. Appl. No. 11/408,753, dated Nov. 30, 2010.

Notice of Allowance in U.S. Appl. No. 11/408,753, dated Dec.13, 2010.

* cited by examiner

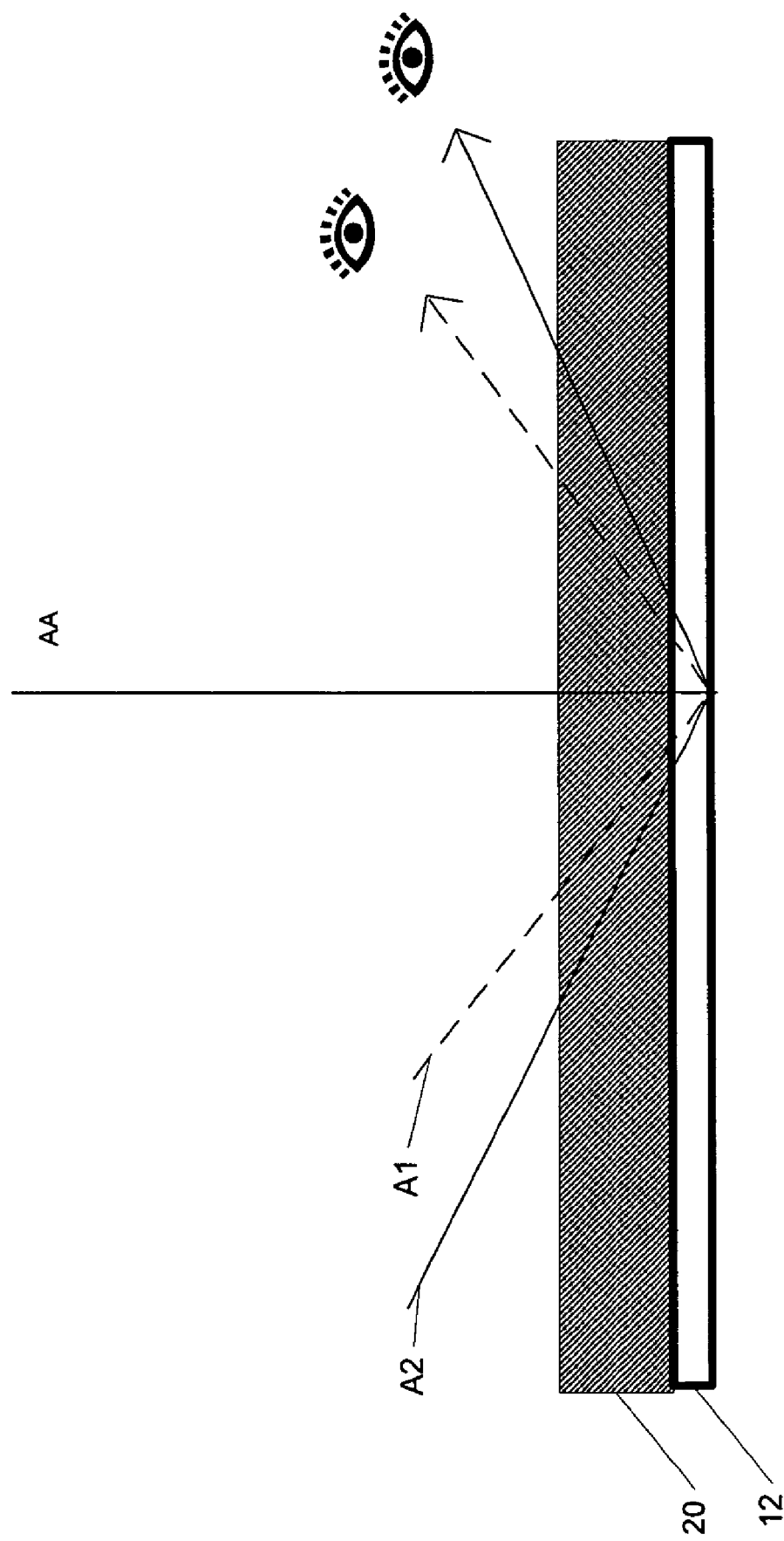

APPARATUS AND METHOD FOR REDUCING PERCEIVED COLOR SHIFT

RELATED APPLICATIONS

This application claims the benefit of U.S. Provisional Application No. 60/613,297 filed Sep. 27, 2004, which is incorporated herein by reference in its entirety.

FIELD

The field of the invention relates microelectromechanical systems (MEMS).

DESCRIPTION OF THE RELATED TECHNOLOGY

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate; the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

For example, color displays may be fabricated using color display devices such as interferometric modulators that reflect color light. In certain cases, however, the color of light output from the display device varies with angle of view. This phenomena is referred to herein as "color shift." What is needed are designs and methods of reducing this color shift.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Preferred Embodiments" one will understand how the features of this invention provide advantages over other display devices. Embodiments include display devices configured to reduce perceived color shift.

One embodiment is a display device including at least one light-modulating element configured to output colored light. The light-modulating element includes first and second reflective surfaces. The second surface is movable with respect to the first surface. The display device further includes a filter comprising a layer of material that selectively transmits certain visible wavelengths and substantially filters other visible wavelengths when illuminated with white light. The filter is positioned to filter light modulated by the light-modulating element. In one embodiment, the layer of material selectively transmits colored light when illuminated with white light.

Another embodiment is a method of fabricating a display. The method includes forming a light-modulating element configured to output colored light, the color light-modulating element comprising first and second reflective surfaces that form a cavity, the second surface being movable with respect to the first surface. The method further includes positioning a filter comprising a layer of material with respect to the light-modulating element such that the filter filters light modulated by the light-modulating element, the layer of material selectively transmitting certain visible wavelengths and substantially filters other visible wavelengths when illuminated with white light.

Another embodiment is a display system including a light-modulating element configured to output light having at least one spectral peak within the visible spectrum, the light-modulating element comprising first and second reflective surfaces, the second surface being movable with respect to the first surface. The display system further includes a light emitter that outputs visible light having at least one spectral peak within the visible spectrum, the light emitter configured to illuminate the first and second reflective surfaces of the light-modulating element. In one embodiment, the light-modulating element is configured to output colored light. In one embodiment, the light emitter comprises a color light emitter that outputs colored light.

Another embodiment is a method of fabricating a display device. The method includes providing a light-modulating element configured to output light having at least one spectral peak within the visible spectrum, the light-modulating element comprising first and second reflective surfaces, the second surface being movable with respect to the first surface. The method further includes positioning a light emitter with respect to the light-modulating element to illuminate the first and second reflective surfaces of the light-modulating element, the light emitter outputting visible light having at least one spectral peak within the visible spectrum.

Another embodiment is a display device including a plurality of light-modulating elements configured to output colored light, the light-modulating elements comprising first and second reflective surfaces, the second surface being movable with respect to the first surface. The display device further includes a filter array comprising a plurality of filter elements that selectively transmit certain visible wavelengths and substantially filters other visible wavelengths when illuminated with white light, at least two of the filter elements having different transmission spectrums, the filter array positioned to filter light modulated by the light-modulating elements.

Another embodiment is a method of fabricating a display. The method includes forming a plurality of light-modulating elements configured to output colored light, the color light-modulating elements comprising first and second reflective surfaces that form a cavity, the second surface being movable with respect to the first surface. The method further includes positioning a filter array comprising a plurality of filter elements with respect to the light-modulating elements such that the filter array filters light modulated by the plurality of light-modulating elements, at least two of the filter elements having different transmission spectrums.

BRIEF DESCRIPTION OF THE DRAWINGS

FIG. 7 is a side cross-sectional view of an interferometric modulator illustrating optical paths through the modulator for demonstrating color shift.

DETAILED DESCRIPTION OF PREFERRED EMBODIMENTS

Various embodiments of display devices have reduced color shift. One embodiment is a display device that includes a color light modulator and a color filter. In one embodiment, a way of reducing color shift for off axis viewing of the modulator is to reduce the intensity of light incident upon the display that would be reflected when viewed off axis and perceived as a color shift. In another embodiment, a color light source is configured to provide light having a spectral content that lacks wavelengths that would be reflected by the light modulator when viewed off axis and perceived by the viewer as a color shift.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
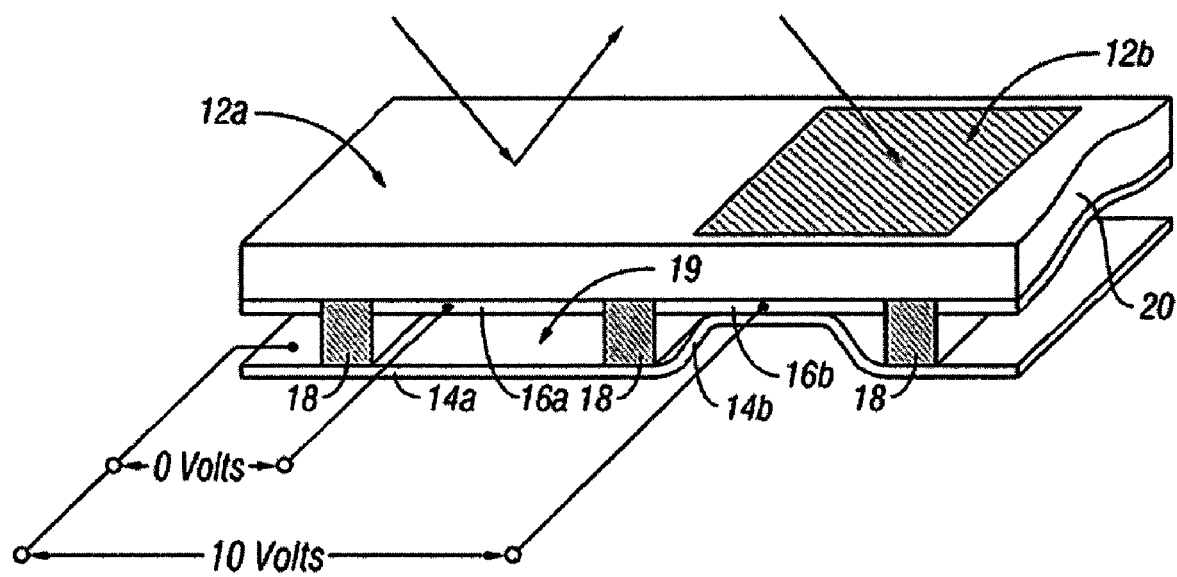
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
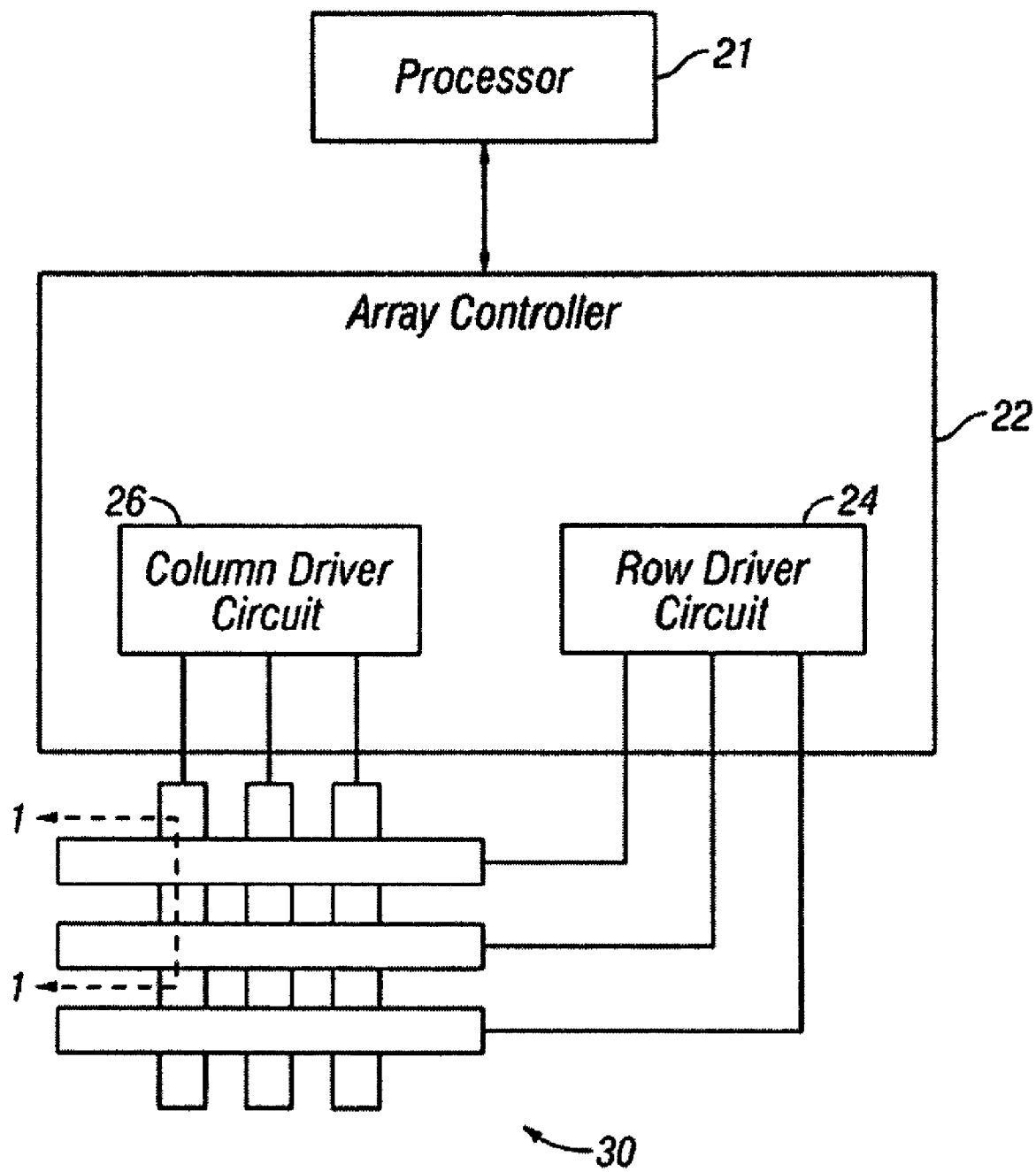
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
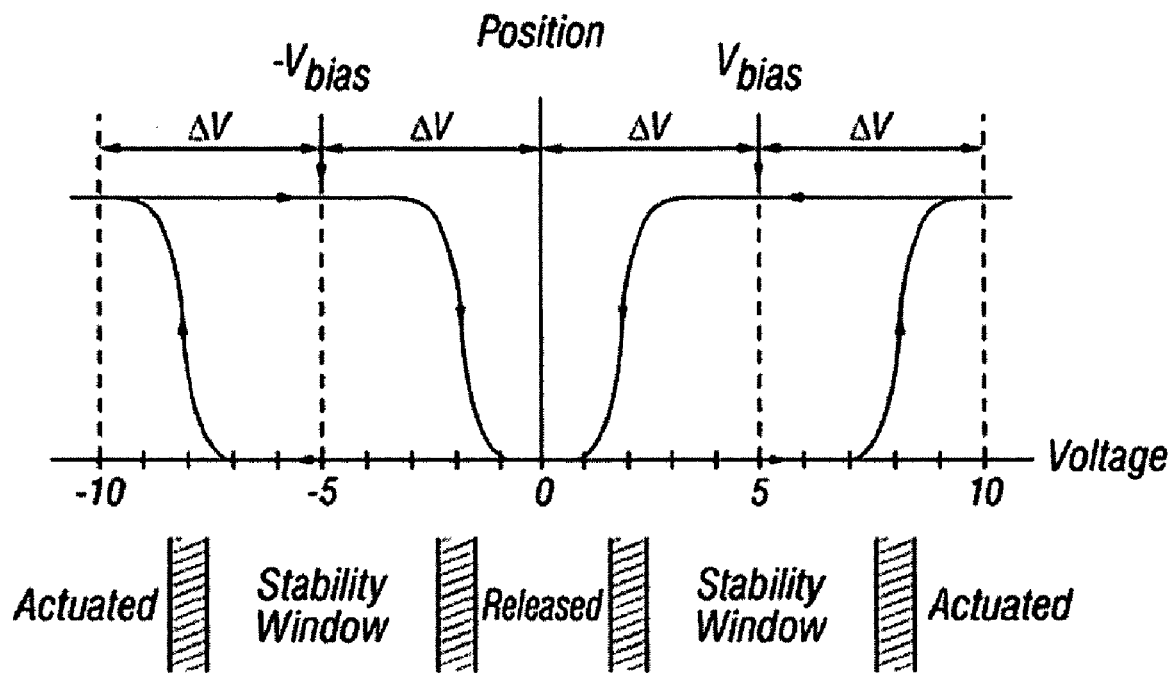
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
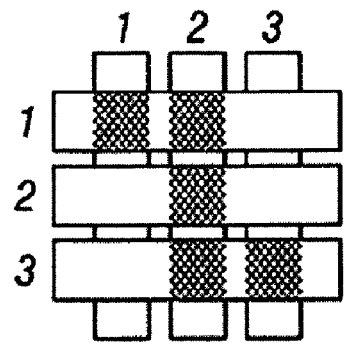
FIGS. 5A and 5B illustrate one exemplary timing diagram for row and column signals that may be used to write a frame of display data to the 3×3 interferometric modulator display of FIG. 2.
Figure 5B:
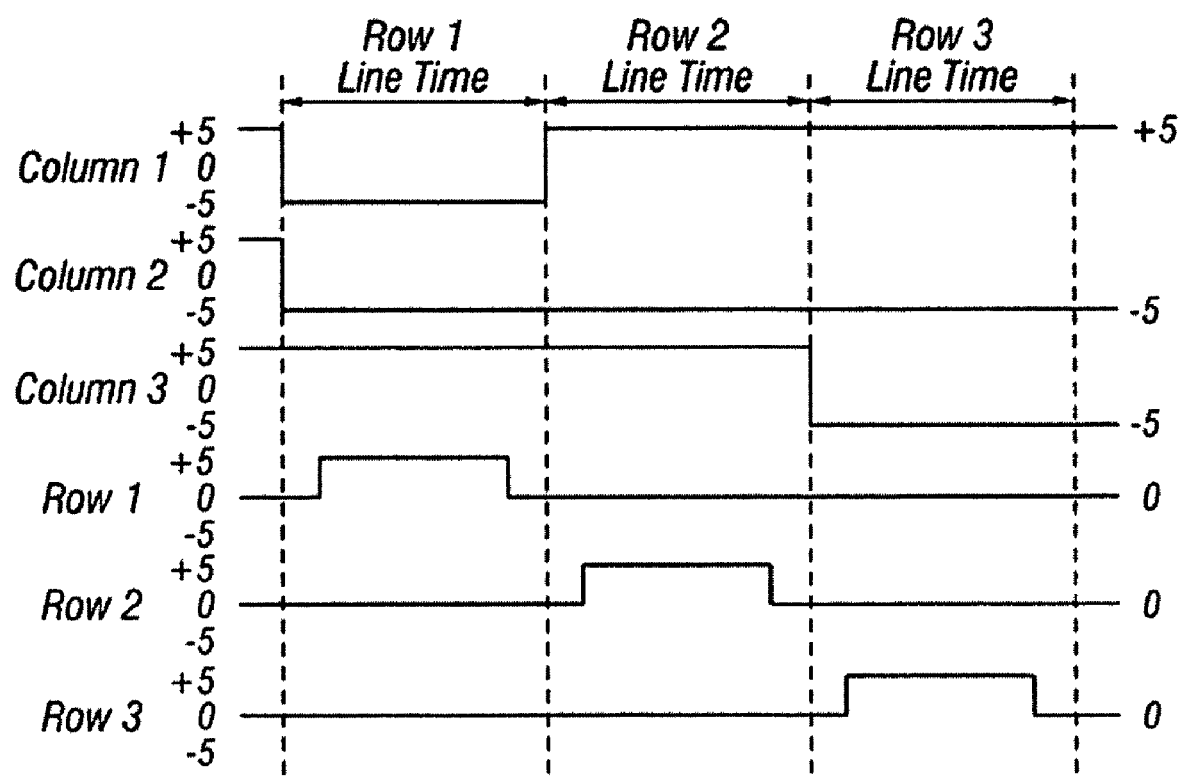

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
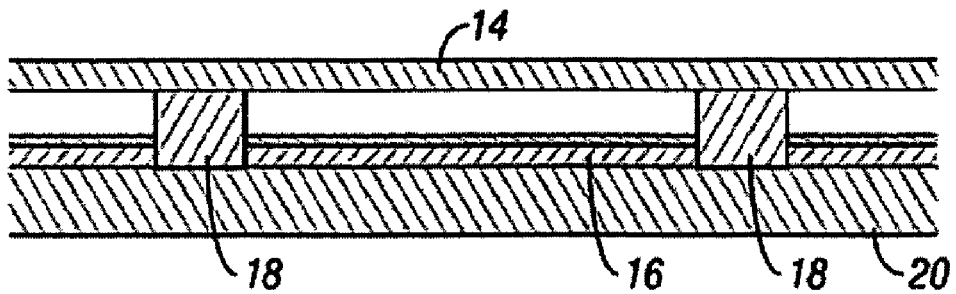
FIG. 6A is a cross section of the device of FIG. 1.
Figure 6B:
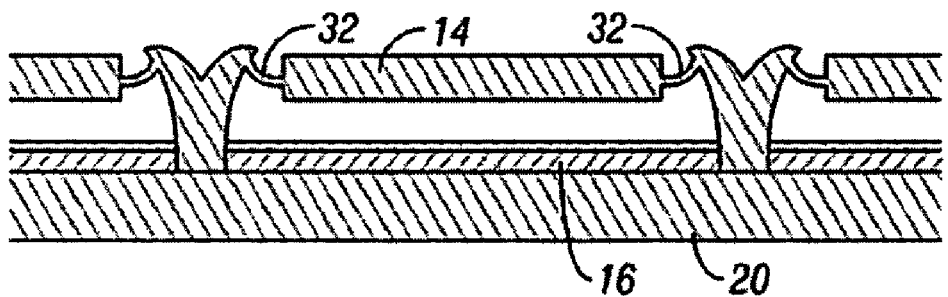
FIG. 6B is a cross section of an alternative embodiment of an interferometric modulator.
Figure 6C:
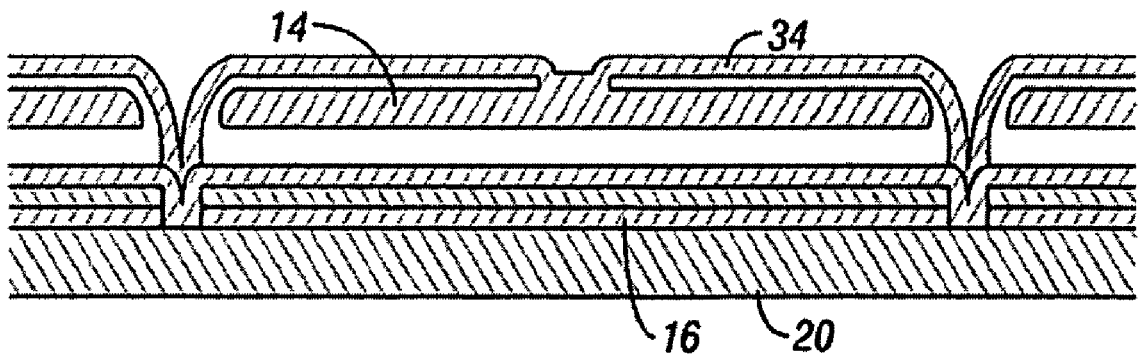
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

FIG. 7 is a side cross-sectional view of an interferometric modulator 12 illustrating optical paths through the modulator 12. The color of light reflected from the interferometric modulator 12 may vary for different angles of incidence (and reflection) with respect to an axis AA as illustrated in FIG. 7. Note that, as used herein, white light generally refers to light having a sufficiently broad spectral content of approximately uniform intensity as to appear to have no particular color to a viewer. Colored light generally refers to light having a sufficiently non-uniform spectral content of visible wavelengths as to appear to have a color to a viewer.

For example, for the interferometric modulator 12 shown in FIG. 7, as light travels along the off-axis path $A_1$, the light is incident on the interferometric modulator at a first angle, reflects from the interferometric modulator, and travels to a viewer. The viewer perceives a first color when the light reaches the viewer as a result of optical interference between a pair of mirrors in the interferometric modulator 12. When the viewer moves or changes his/her location and thus view angle, the light received by the viewer travels along a different off-axis path $A_2$ having corresponding a second different angle of incidence (and reflection). Optical interference in the interferometric modulator 12 depends on the optical path length of light propagated within the modulator. Different optical path lengths for the different optical paths $A_1$ and $A_2$ therefore yield different outputs from the interferometric modulator 12. The user therefore perceives different colors depending on his or her angle of view. As described above, this phenomenon is referred to as a "color shift." This color shift is typically identified with reference to a color produced by an interferometric modulator 12 when viewed along the axis AA.

For some applications, a reduction in brightness at off-angles may be an acceptable trade-off for reducing the degree of color shift at such off-axis view angles. Thus, in one embodiment, a way of reducing color shift for off axis viewing is to reduce the intensity of light incident upon the display that would be reflected and perceived as color shifted light when viewed off axis. This has the effect of reducing the brightness of the display when viewed off axis relative to viewing normal to the display. As described above, the perceived color of the interferometric modulator 12 is a function of viewing angle. In addition, as the interferometric modulator 12 merely reflects, rather than generates light, the color of reflected light is dependent on the color of light received by the interferometric modulator 12. Thus, in one embodiment, the degree of color shift of the interferometric modulator 12 observed by off-axis viewing is reduced by filtering light that is incident on the interferometric modulator 12.

Figure 8:
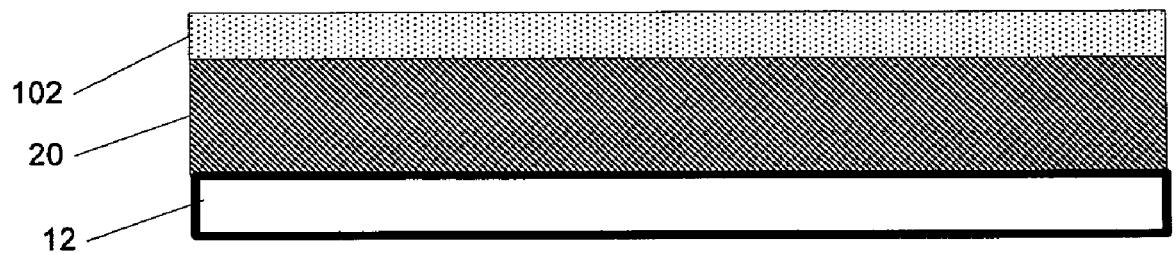
FIG. 8 is a side cross-sectional view of the interferometric modulator having a layer of material for selectively transmitting light of a particular color.

FIG. 8 is a side cross-sectional view of the interferometric modulator 12 having a layer 102 of material for selectively transmitting light of a particular color. The layer 102 of material may include an absorptive color filter. Absorptive filters typically include one or more layers of material that have been doped with a concentration of dye that absorbs particular colors. In one embodiment, the filter comprises dyed photoresist. Exemplary absorptive filter materials are commercially available from several sources, such as International Light, Inc. (Newburyport, Mass. 01950). In embodiments such as illustrated in FIG. 8, the layer 102 of material is positioned so as to filter light incident on the interferometric modulator 12 and light reflected by the interferometric modulator 12. This operation of both incident and reflected light further increases the amount of filtering. In particular, in such embodiments, the layer 102 may be less absorptive of the selected wavelengths of light than would be necessary if light passed through the filter only on the incoming portion of the optical paths of reflected light.

In another embodiment, the layer 102 of material may be positioned with respect to the light modulator so that only light reflected by the modulator passes through the filter. For example, a layer of material that forms a light pipe to guide light to illuminate the interferometric modulator 12 may be positioned between the interferometric modulator 12 and the layer 102 of material so that the layer 102 of material only filters light reflected by the interferometric modulator.

In another embodiment, the layer 102 of material may be positioned so as to filter light from an illumination source before that light is incident on the interferometric modulator 12. In such an embodiment, the layer 102 of material may be placed anywhere in the optical path between the source of illumination and the interferometric modulator 12. In particular, the layer 102 of material may be positioned so that light passes through the layer 102 of material only prior to being reflected by the interferometric modulator 12.

In operation, the layer 102 may be positioned to filter light that is incident light on the interferometric modulator 12, positioned to filter light reflected by the interferometric modulator, or positioned so as to filter incident and reflected light. For example, in FIG. 8, the layer 102 is positioned so as to filter both incident and reflected light. However, in other embodiments, the layer 102 may be positioned relative to a light source or the viewer so as to only filter incident light or reflected light from the interferometric modulator 12.

Figure 9:
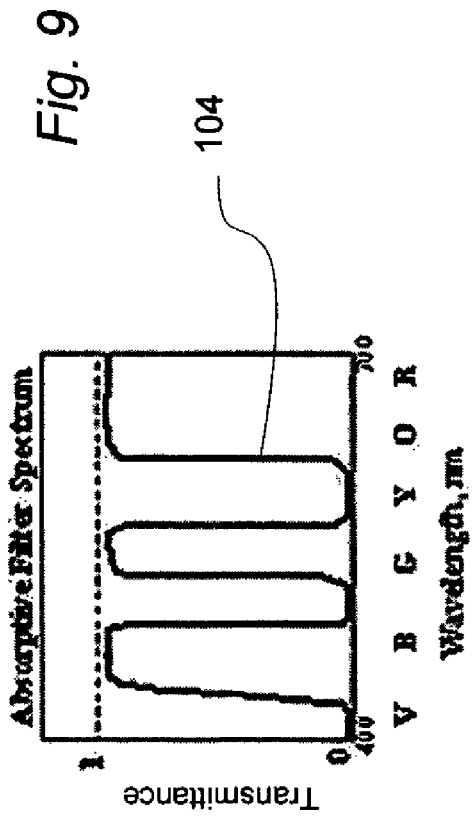
FIG. 9 is a graphical diagram depicting the transmittance of light through an exemplary layer of absorptive material.

FIG. 9 is a graphical diagram depicting the transmittance of light through an exemplary layer 102 of absorptive material. The horizontal axis represents the wavelength of incident light. The vertical axis represents the transmittance of light. A trace 104 depicts the transmittance of the exemplary layer 102 of material. The trace 104 has three transmittance peaks that correspond to wavelength bands associated with primary colors red, green, and blue. In one embodiment, the spectral response of the layer 102 is selected so that the layer 102 substantially reduces the intensity of the shifted wavelengths of light that would resonate within the interferometric cavity when viewed off axis without substantially reducing the intensity of the wavelengths of light that would be reflected when viewed along or near normal incidence.

Figure 10:
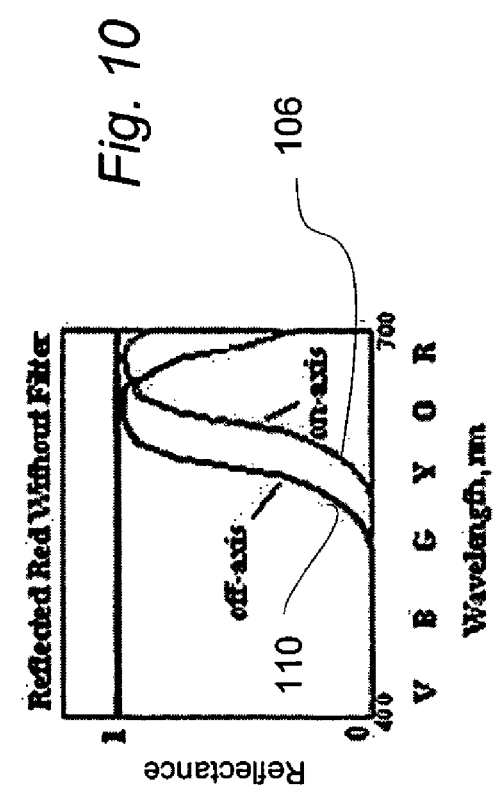
FIG. 10 is a graphical diagram that shows the spectral response of the interferometric modulator when viewed at two positions, one on-axis, and one off-axis thereby illustrating color shift.

FIG. 10 is a graphical diagram in a form similar to FIG. 9, which illustrates the spectral response of the interferometric modulator when viewed at two positions, one on-axis, and one off-axis. In FIG. 10, the vertical represents the reflectance of light from the interferometric modulator 12, rather than transmittance as in FIG. 9. The trace 106 illustrates the on-axis reflectance of the interferometric modulator 12. The trace 106 includes a peak in the spectral response in the range of wavelengths associated with red, i.e., the spectral response is of a "red" interferometric modulator 12. A trace 110 illustrates the reflectance of the red interferometric modulator 12 at one particular off-axis angle of view. The trace 110 includes a peak that is shifted towards the blue portion of the spectrum, e.g., so that the "red" interferometric modulator 12 appears to be orange.

Figure 11:
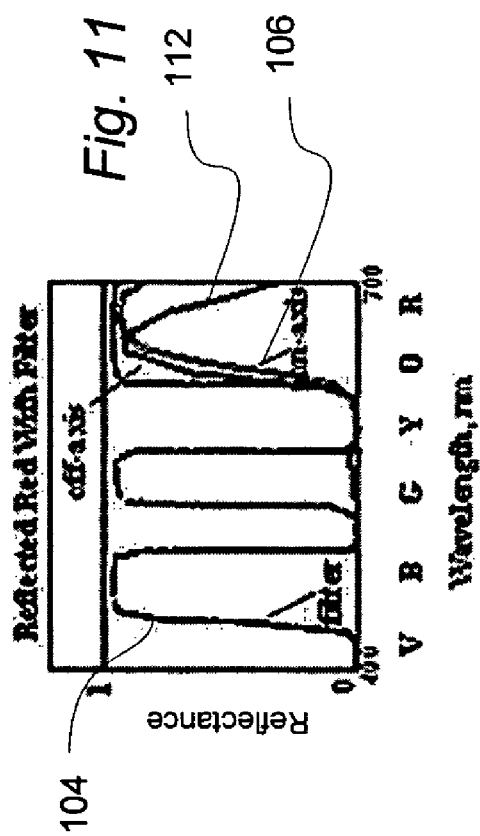
FIG. 11 is a graphical diagram that illustrates the spectral response of the interferometric modulator when viewed at two positions, one on-axis, and one off-axis through an exemplary layer of absorptive material that reduces color shift.

FIG. 11 is a graphical diagram in a form similar to FIG. 9, which illustrates the spectral response of the interferometric modulator 12 when viewed at two positions, one on-axis, and one off-axis, through the layer 102 of absorptive material. In FIG. 10, the vertical axis represents the total fraction of light incident on the interferometric modulator that is both reflected by the interferometric modulator 12 and transmitted by the layer 102. The traces 104 and 106, which illustrate the spectral response of the layer 102 and the "red" interferometric modulator 12, respectively, are shown with reference to a trace 112 which illustrates the spectral response of reflected light of an embodiment of a display that includes the layer 102 and the "red" interferometric modulator 12. As shown by FIG. 11, the peak in the red end of the visible spectrum of the trace 112 falls sharply between the red and orange portions of the spectrum. The red spectral peak of the layer 102 along the trace 104 substantially overlaps the spectral peak of the modulator 12 along the trace 106, e.g., the range of wavelengths over which the peaks extend substantially overlap. Thus, when viewed from off-axis, although the spectral response of the interferometric modulator 12 is shifted toward blue (to the left of FIG. 11), the wavelengths of reflected light that are outside the peak red transmittance band of the layer 102 as illustrated in the trace 104, are filtered out, thus reducing the overall degree of perceived color shift. Because the transmittance of the filter is close to 100% in the portion of the red band that substantially overlaps with the peak of the trace 106, the layer 102 does not substantially reduce the intensity of light reflected by the interferometric modulator when viewed on-axis.

Figure 12:
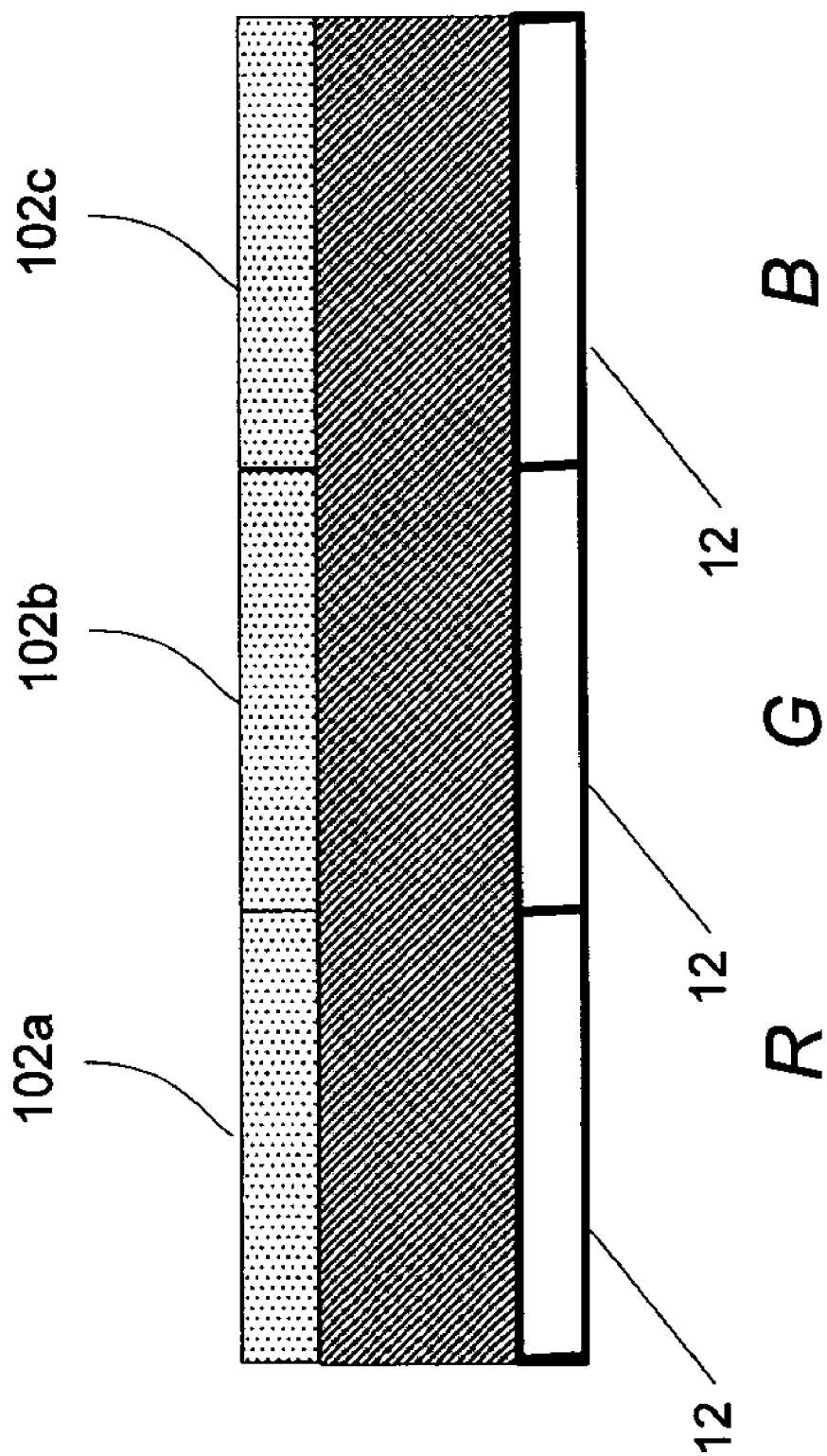
FIG. 12 is a side cross-sectional view of a portion of another embodiment of a color interferometric modulator display, which includes different layers of absorptive material for each of a set of red, green, and blue interferometric modulators.

In one embodiment of a color display including interferometric modulators 12, the display pixels each include one or more red, green, and blue interferometric modulators 12. In one embodiment, the display includes one or more layers 102 having appropriate transmission peaks in each of red, green, and blue. FIG. 12 is a side cross-sectional view of a portion of one embodiment of a color interferometric modulator display, which includes different layers 102a, 102b, and 102c of absorptive material for each of a set of red, green, and blue interferometric modulators 12. Each of the layers 102a, 102b, and 102c may include different materials and/or different thicknesses of material or other parameters so that each layer 102a, 102b, and 102c substantially transmits light of only red, green, and blue, respectively.

In other embodiments, the pixel array 30 comprises monochrome pixels, e.g., all of the interferometric modulators 12 in the pixels reflect light having substantially the same spectral content. In such embodiments, the filter layer 102 selectively transmits the color of the monochrome pixels.

It is to be recognized that while certain embodiments have been discussed with respect to absorptive filters, in other embodiments, other suitable types of color filter may be included. For example, in one embodiment, an interferometric filter is placed between a source of illumination and the interferometric modulator 12 so as to remove wavelengths from the input to the modulator 12 that would be reflected by the modulator 12 and appear to the viewer only when viewed off axis.

In other embodiments, particularly embodiments for use with included light sources rather than ambient lighting, the interferometric modulator 12 may be configured to be illuminated by light having a limited spectral content to reduce perceived off-angle color shift. In particular, in such embodiments, the light source is configured to produce light that does not include the wavelengths of light that appear as shifted light when the modulator 12 is viewed from an off-axis angle of view. For example, one embodiment includes red, green, and blue interferometric modulators 12 paired with a light source illuminating the modulators 12 with red, green, and blue light.

Figure 13:
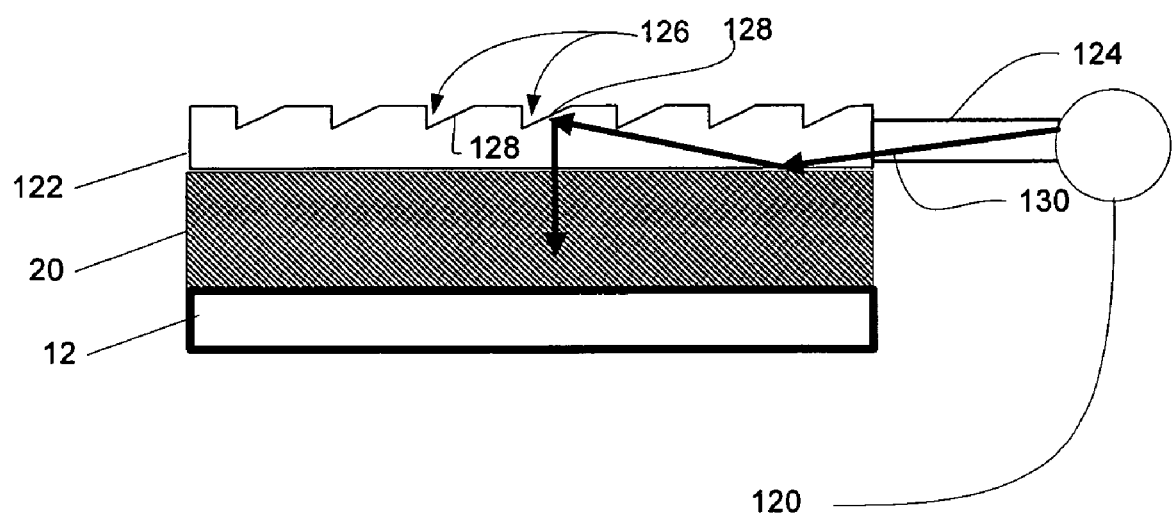
FIG. 13 is a side cross-sectional view of an exemplary display that includes the interferometric modulator and a light source.

FIG. 13 is a side cross-sectional view of an exemplary display that includes the interferometric modulator 12 and a light source 120. In the exemplary display, the light source 120 illuminates the modulator 12 via a light guide plate 122. In one embodiment, a light guide 124 is configured to direct light from the light source 120 to the light guide plate 122. The light guide plate 122 may include grooves 126 that are formed by angled surfaces 128 from which light 130 may be reflected. In one embodiment, the light 130 emitted by light source 120 is maintained within the light guide plate 122 by total internal reflection until the light 130 reflects from the surfaces 128, from which it is reflected through the substrate 20 and into the modulator 12. In other embodiments, any suitable guiding structure may be used. In some embodiments, the light source 120 is a front light positioned to illuminate the interferometric modulator 12. One suitable light source includes one or more color light emitting diodes (LEDs) that have narrow band spectral outputs. For example, suitable LEDs are produced by Nichia Corporation, Mountville, Pa. One such LED is Nichia Corporation, part number NSTM515AS. This LED includes a common anode lead and separate cathode leads for red, blue, and green.

In another embodiment, the light source includes a fluorescent light source, for example, a ultraviolet LED configured to cause suitable phosphors to fluoresce with the desired colors, e.g., red, green, and blue.

Figure 14:
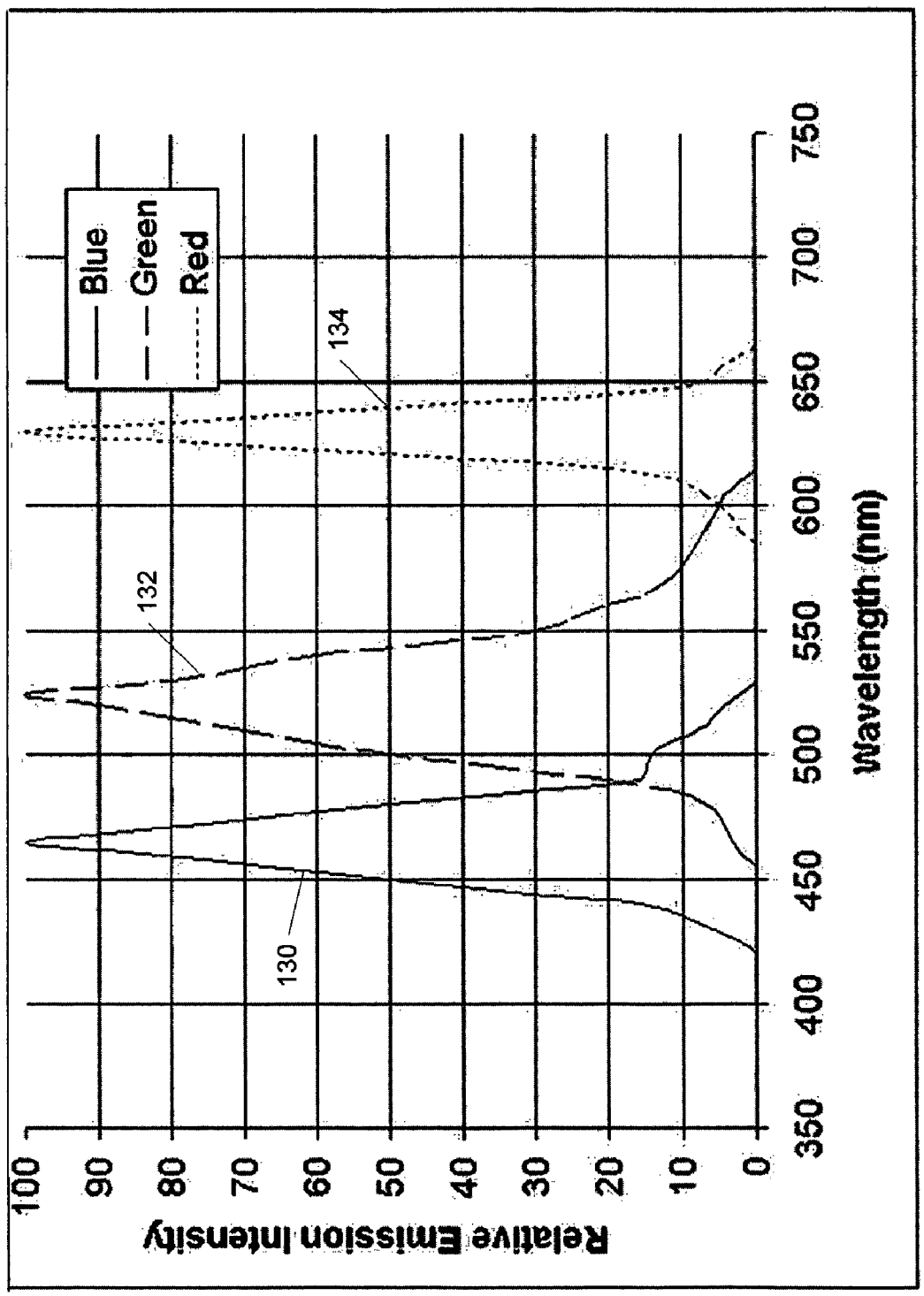
FIG. 14 is a graphical diagram illustrating the spectral response of an exemplary light source.

FIG. 14 is a graphical diagram illustrating the spectral response of an exemplary light source 122. The horizontal axis depicts wavelength of emitted light. The vertical axis depicts the relative emission intensity of an exemplary light source, such as the Nichia NSTM515AS. Traces 130, 132, and 134 illustrate three peaks in the output of the light source at approximately 460, 525, and 630 nm, respectively. These peaks in the traces 130, 132, and 134 correspond to blue, green, and red light. Each of the peaks of the exemplary light source has a width at the half maximum of the peak of approximately 50 nm. Other light sources may have peaks of different widths, such as between 10-100 nm, or 30-60 nm.

Figure 15:
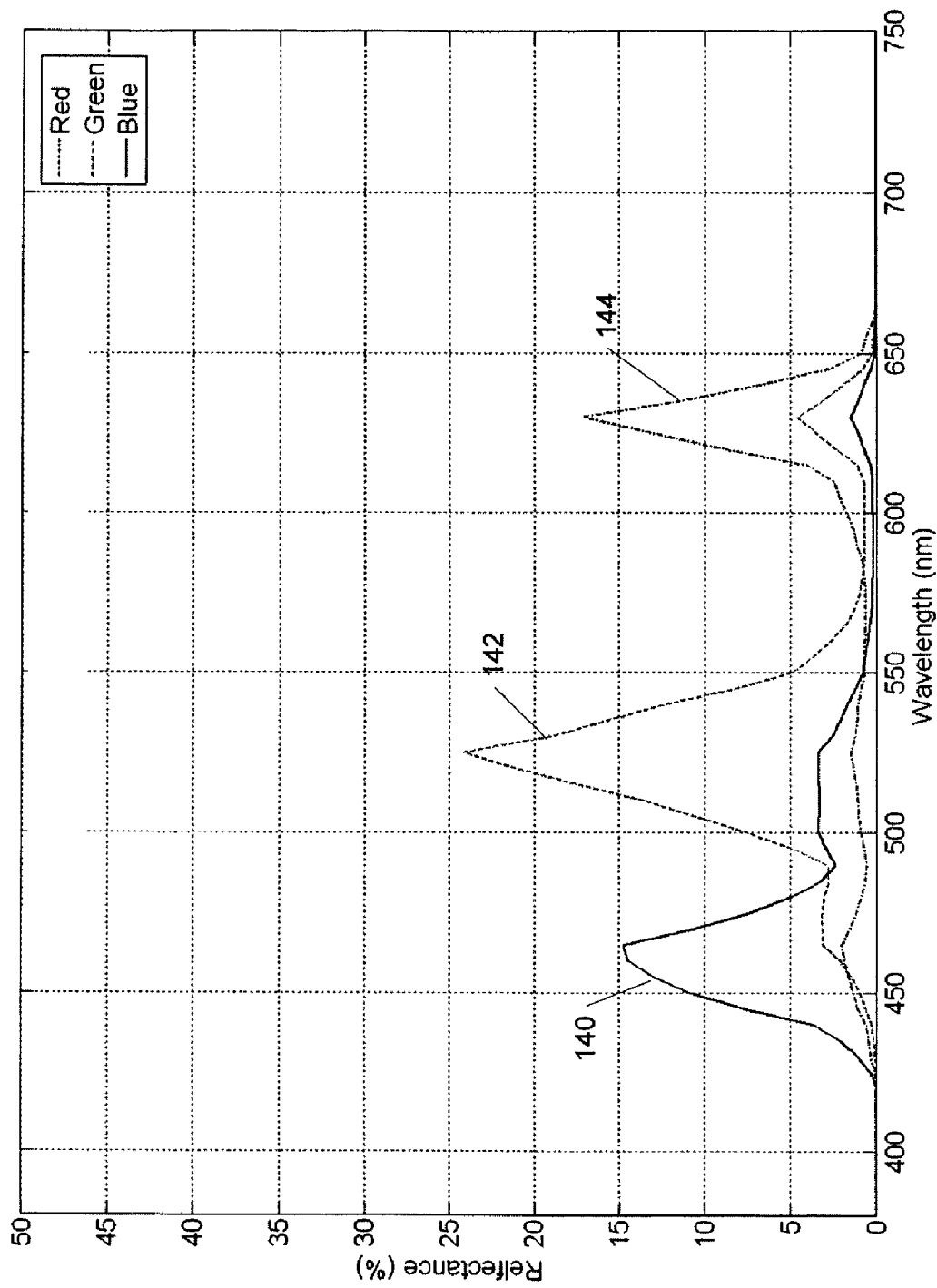
FIG. 15 is a graphical diagram illustrating the spectral response of a display including an interferometric modulator illuminated by the exemplary light source of FIG. 14.

FIG. 15 is a graphical diagram illustrating the spectral response of a display including the interferometric modulator 12 illuminated by the exemplary light source 122 of FIG. 14. The horizontal axis depicts wavelength of reflected light. The vertical axis depicts the reflectivity of light from the interferometric modulators 12. In the illustrated embodiment, the display includes red, green, and blue interferometric modulators. Thus, traces 140, 142, and 144 illustrate the respective responses of the blue, green, and red interferometric modulators when illuminated by the exemplary light source 122. The "blue" trace 140 has a peak centered at 455 nm. The "green" trace 142 has a peak centered at 530 nm. The "red" trace 144 has a peak centered at 615 nm. As the light on the interferometric modulators 12 from the light source 122 is characterized by the sharp peaks illustrated in FIG. 14, the display illustrated in FIG. 15 is characterized by reduced color shift such as shown in FIG. 11 because the light source produces little light for the modulators 12 to reflect when viewed from off-axis angles.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A display device comprising:
    at least one light-modulating element configured to output colored light, said light-modulating element comprising first and second reflective surfaces that define an optical cavity, said second surface being movable with respect to said first surface so as to adjust an optical path length of said optical cavity, wherein the at least one light-modulating element comprises an interferometric modulator; and
    a filter comprising a layer of material that selectively transmits certain visible wavelengths and substantially filters other visible wavelengths when illuminated with white light, said filter positioned to filter light modulated by said light-modulating element so as to reduce variation of color of said output colored light with angle of view.

2. The display device of claim 1, wherein said filter is positioned to filter incident light modulated by said light modulating element.

3. The display device of claim 1, wherein said filter is positioned to filter light output by said light modulating element.

4. The display device of claim 3, wherein said filter is positioned to filter incident light modulated by said light modulating element.

5. The display device of claim 1, wherein said filter has at least one red, green or blue transmission peak that selectively transmits at least one of red, green, or blue light.

6. The display device of claim 1, wherein said light selectively transmitted by said filter has a color substantially corresponding to said output colored light of said light-modulating element.

7. The display device of claim 1, wherein said light selectively transmitted by said filter comprises at least red and green light, red and blue light, or green and blue light.

8. The display device of claim 1, wherein said light selectively transmitted by said filter comprises at least red, green, and blue light.

9. The display device of claim 1, wherein said interferometric modulator is configured to selectively output said colored light based on selective movement of said movable second surface which adjusts said optical path length of said optical cavity.

10. The display device of claim 1, further comprising a transmissive substrate positioned between said first reflective surface and said filter.

11. The display device of claim 1, wherein said material comprises a light absorbing material.

12. The display device of claim 11, wherein said material comprises dyed material.

13. The display device of claim 12, wherein said dyed material comprises dyed photoresist.

14. The display device of claim 1, wherein said filter forms part of a filter array comprising different filter elements configured to transmit at least two different colors respectively.

15. The display device of claim 14, wherein said filter array comprises red, green, and blue color filter elements.

16. The display device of claim 1, wherein the at least one light-modulating element is configured to receive incident ambient light and modulate said received ambient light thereby outputting said color light and said filter is positioned to transmit a portion of said incident ambient light received by said light-modulating element and transmit at least a portion of said modulated ambient light output by said light-modulating element so as to reduce variation of color of said output colored light with angle of view.

17. The display device of claim 1, wherein said interferometric modulator and filter are included in a reflective display.

18. The display device of claim 1, wherein the filter is configured to provide a band pass response characterized by a particular color, whereby the filter selectively transmits visible wavelengths associated with said particular color and substantially filters other visible wavelengths.

19. The display device of claim 1, further comprising electronics configured to drive the second reflective surface such that light reflected by said first and second reflective surfaces can be modulated so as to form part of an image viewable on a display.

20. The display device of claim 19, wherein the display is configured to form the image by selectively modulating ambient light.

21. The display device of claim 1, wherein said display device comprises a display element included in an array of display elements of a display such that light reflected by said first and second reflective surfaces forms part of an image produced by said array of display elements.

22. A method of fabricating a display, comprising:
    forming a light-modulating element configured to output colored light, said color light-modulating element comprising first and second reflective surfaces that form an optical cavity, said second surface being movable with respect to said first surface so as to adjust an optical path length of said optical cavity, wherein the at least one light-modulating element comprises an interferometric modulator; and positioning a filter comprising a layer of material with respect to said light-modulating element such that said filter filters light modulated by said light-modulating element, said layer of material selectively transmitting certain visible wavelengths and substantially filtering other visible wavelengths when illuminated with white light so as to reduce variation of color of said output colored light with angle of view.

23. The method of claim 22, wherein positioning said filter comprises positioning said filter to filter incident light modulated by said light modulating element.

24. The method of claim 22, wherein positioning said filter comprises positioning said filter to filter light output by said light modulating element.

25. The method of claim 24, wherein positioning said filter comprises positioning said filter to filter incident light modulated by said light modulating element.

26. The method of claim 22, wherein said light selectively transmitted by said filter comprises at least one of red, green, or blue light.

27. The method of claim 22, wherein said light selectively transmitted by said filter comprises a color substantially corresponding to said output colored light of said light-modulating element.

28. The method of claim 22, wherein said light selectively transmitted by said filter includes at least two colors selected from the group comprising red, green, and blue color light.

29. The method of claim 22, wherein forming said light-modulating element comprises forming said light-modulating element on a transmissive substrate positioned between said first reflective surface and said filter.

30. The method of claim 22, wherein said material comprises a light absorbing material.

31. The method of claim 30, wherein said material comprises dyed material.

32. The method of claim 31, wherein said dyed material comprises dyed photoresist.

33. The method of claim 22, wherein positioning said filter comprises positioning a filter array comprising at least two different filter elements configured to transmit at least two different colors respectively.

34. The method of claim 33, wherein said filter array comprises red, green, and blue color filter elements.

35. A display device formed by said method of claim 22.

36. The method of claim 22, wherein the light-modulating element is configured to receive incident ambient light and modulate said received ambient light thereby outputting said color light and said filter is positioned to transmit a portion of said incident ambient light received by said light-modulating element and transmit a least a portion of said modulated ambient light output by said light-modulating element so as to reduce variation of color of said output colored light with angle of view.

37. The method of claim 22, wherein said interferometric modulator and filter are included in a reflective display.

38. The method of claim 22, wherein said filter is configured to provide a band pass response characterized by a particular color, whereby the filter selectively transmits visible wavelengths associated with said particular color and substantially filters other visible wavelengths.

39. The method of claim 22, further comprising providing electronics configured to drive the second reflective surface such that light reflected by said first and second reflective surfaces can be modulated so as to form part of an image viewable on the display.

40. The method of claim 39, wherein the display is configured to form the image by selectively modulating ambient light.

41. The method of claim 22, wherein said display comprises a display element included in an array of display elements of said display such that light reflected by said first and second reflective surfaces forms part of an image produced by said array of display elements.

42. A display system comprising:
a light-modulating element configured to output colored light having at least one spectral peak within the visible spectrum, said light-modulating element comprising first and second reflective surfaces that define an optical cavity, said second surface being movable with respect to said first surface so as to adjust an optical path length of said optical cavity, wherein the light-modulating element comprises an interferometric modulator; and
a light emitter that outputs visible light having at least one spectral peak within the visible spectrum, said light emitter configured to illuminate said first and second reflective surfaces of said light-modulating element so as to reduce variation of color of said output light with angle of view.

43. The display device of claim 42, wherein said light emitter comprises a color light emitter that outputs colored light.

44. The display device of claim 43, wherein said colored light outputted by said light emitter comprises at least one of red, green, or blue light.

45. The display device of claim 42, wherein said light provided by said light emitter comprises colored light substantially corresponding to said colored light output by said light-modulating element.

46. The display device of claim 42, wherein said light provided by said light emitter comprises at least red and green, red and blue, or green and blue light.

47. The display device of claim 42, wherein said light provided by said light emitter comprises at least red, green, and blue.

48. The display device of claim 42, further comprising a plurality of light emitters.

49. The display device of claim 48, wherein said light emitters comprise red, green, and blue color light emitters.

50. The display device of claim 49, wherein said red, green, and blue light emitters produce light at a range of wavelengths that are respectively centered at about 650, 550, and 450 nm.

51. The display device of claim 42, wherein said spectral peak of said light emitter substantially overlaps a spectral peak of said light-modulating element.

52. The display system of claim 42, wherein said interferometric modulator is included in a reflective display.

53. The display system of claim 42, further comprising electronics configured to drive the second reflective surface such that light reflected by said first and second reflective surfaces can be modulated so as to form part of an image viewable on a display.

54. The display system of claim 42, wherein said display system comprises a display element included in an array of display elements of a display such that light reflected by said first and second reflective surfaces forms part of an image produced by said array of display elements.

55. A method of fabricating a display device comprising:
providing a light-modulating element configured to output colored light having at least one spectral peak within the visible spectrum, said light-modulating element comprising first and second reflective surfaces that form an optical cavity, said second surface being movable with respect to said first surface so as to adjust an optical path length of said optical cavity, wherein the light-modulating element comprises an interferometric modulator; and positioning a light emitter with respect to said light-modulating element to illuminate said first and second reflective surfaces of said light-modulating element, said light emitter outputting visible light having at least one spectral peak within the visible spectrum so as to reduce variation of color of said output light with angle of view.

56. A display device fabricated by the method of claim 55.

57. The method of claim 55, wherein said interferometric modulator is included a reflective display.

58. The method of claim 55, further comprising providing electronics configured to drive the second reflective surface such that light reflected by said first and second reflective surfaces can be modulated so as to form part of an image viewable on a display.

59. The method of claim 55, wherein said display device comprises a display element included in an array of display elements of a display such that light reflected by said first and second reflective surfaces forms part of an image produced by said array of display elements.

60. A display device comprising:
a plurality of light-modulating elements configured to output colored light, said light-modulating elements comprising first and second reflective surfaces that define an optical cavity, said second surface being movable with respect to said first surface so as to adjust an optical path length of said optical cavity, wherein the plurality of light-modulating elements includes an interferometric modulator; and
a filter array comprising a plurality of filter elements that selectively transmit certain visible wavelengths and substantially filter other visible wavelengths when illuminated with white light, at least two of said filter elements having different transmission spectrums, said filter array positioned to filter light modulated by said light-modulating elements so as to reduce variation of color of said output colored light with angle of view.

61. The display device of claim 60, wherein the plurality of light-modulating elements are configured to receive incident ambient light and modulate said received ambient light thereby outputting said color light and said filter elements are positioned to transmit a portion of said incident ambient light received by said light-modulating elements and transmit at least a portion of said modulated ambient light output by said light-modulating elements so as to reduce variation of color of said output colored light with angle of view.

62. The display device of claim 60, wherein plurality of interferometric modulators and filter array are included a reflective display.

63. The display device of claim 60, further comprising electronics configured to drive the second reflective surfaces such that light reflected by said first and second reflective surfaces can be modulated so as to form part of an image viewable on a display.

64. The display device of claim 63, wherein the display is configured to form the image by selectively modulating ambient light.

65. A method of fabricating a display, comprising:
forming a plurality of light-modulating elements configured to output colored light, said color light-modulating elements comprising first and second reflective surfaces that form an optical cavity, said second surface being movable with respect to said first surface so as to adjust an optical path length of said optical cavity, wherein the plurality of light-modulating elements includes an interferometric modulator; and
positioning a filter array comprising a plurality of filter elements with respect to said light-modulating elements such that said filter array filters light modulated by said plurality of light-modulating elements, at least two of said filter elements having different transmission spectrums, so as to reduce variation of color of said output colored light with angle of view.

66. The method of claim 65, wherein the plurality of light-modulating elements are configured to receive incident ambient light and modulate said received ambient light thereby outputting said color light and said filter elements are positioned to transmit a portion of said incident ambient light received by said light-modulating elements and transmit at least a portion of said modulated ambient light output by said light-modulating elements so as to reduce variation of color of said output colored light with angle of view.

67. The method of claim 65, wherein the plurality of light-modulating elements and the filter array are included in a reflective display.

68. The method of claim 65, further comprising providing electronics configured to drive the second reflective surfaces such that light reflected by said first and second reflective surfaces can be modulated so as to form part of an image viewable on the display.

69. The method of claim 68, wherein the display is configured to form the image by selectively modulating ambient light.

70. A display device comprising:
means for interferometrically modulating incident light so as to output colored light, said means comprising an interferometric modulator; and
means for selectively transmitting certain visible wavelengths and substantially filtering other visible wavelengths when illuminated with white light, wherein said means for selectively transmitting reduces perceived color shift of said output colored light so as to reduce variation of color of said output colored light with angle of view.

71. The device of claim 70, wherein said modulating means comprises a plurality of light-modulating elements configured to output colored light, said color light-modulating elements comprising first and second reflective surfaces that form an optical cavity, said second surface being movable with respect to said first surface so as to adjust an optical path length of said optical cavity or said selectively transmitting means comprises a plurality of filter elements disposed with respect to said modulating means such that said plurality of filter elements filters light modulated by said modulating means so as to reduce variation of color of said output colored light with angle of view.

72. The display device of claim 70, wherein the interferometrically modulating means are configured to receive incident ambient light and modulate said received ambient light thereby outputting said color light and said selectively transmitting means is positioned to selectively transmit said incident ambient light received by said interferometrically modulating means and selectively transmit said modulated ambient light output by said interfometrically modulating means so as to reduce variation of color of said output colored light with angle of view.

73. The display device of claim 70, wherein said interferometric modulator and selectively transmitting means are included in a reflective display.

74. The display device of claim 70, further comprising electronics configured to drive the interferometrically modulating means such that light reflected by said interferometrically modulating means can be modulated so as to form part of an image viewable on a display.

75. The display device of claim 74, wherein the display is configured to form the image by selectively modulating ambient light.

76. A display device, comprising:
- means for interferometrically modulating incident light so as to output colored light having at least one spectral peak within the visible spectrum, said means comprising an interferometric modulator; and
- means for illuminating said means for interferometrically modulating with visible light having at least one spectral peak within the visible spectrum so as to reduce variation of color of said output light with angle of view.

77. The device of claim 76, wherein said modulating means comprises a light-modulating element configured to output light having at least one spectral peak within the visible spectrum, said light-modulating element comprising first and second reflective surfaces that form an optical cavity, said second surface being movable with respect to said first surface so as to adjust an optical path length of said optical cavity or said illuminating means comprises a light emitter disposed with respect to said modulating means to illuminate said modulating means.

78. The display device of claim 76, wherein said interferometric modulator is included in a reflective display.

79. The display device of claim 76, further comprising electronics configured to drive the interferometrically modulating means such that light reflected by said interferometrically modulating means can be modulated so as to form part of an image viewable on a display.

80. The display device of claim 76, wherein said display device comprises a display element included in an array of display elements of a display such that light reflected by said interferometrically modulating means forms part of an image produced by said array of display elements.

* * * * *

UNITED STATES PATENT AND TRADEMARK OFFICE
CERTIFICATE OF CORRECTION

PATENT NO. : 7,928,928 B2
APPLICATION NO. : 11/077974
DATED : April 19, 2011
INVENTOR(S) : Brian J. Gally and Manish Kothari It is certified that error appears in the above-identified patent and that said Letters Patent is hereby corrected as shown below:

On Page 4, Column 1, Line 64, under Other Publications, change "Quanum" to --Quantum--.

On Page 4, Column 1, Line 69, under Other Publications, change "Micromaching" to --Micromachining--.

On Page 4, Column 2, Line 1, under Other Publications, change "Rosonator" to --Resonator--.

On Drawing Sheet 12 of 12, Figure 15 (y-axis), change "Relfectance" to --Reflectance--.

In Column 14, Line 24, In Claim 43, change "device" to --system--.

In Column 14, Line 27, In Claim 44, change "device" to --system--.

In Column 14, Line 30, In Claim 45, change "device" to --system--.

In Column 14, Line 34, In Claim 46, change "device" to --system--.

In Column 14, Line 37, In Claim 47, change "device" to --system--.

In Column 14, Line 40, In Claim 48, change "device" to --system--.

In Column 14, Line 42, In Claim 49, change "device" to --system--.

In Column 14, Line 44, In Claim 50, change "device" to --system--.

In Column 14, Line 47, In Claim 51, change "device" to --system--.

In Column 15, Line 14, In Claim 57, change "a" to --in a--.

In Column 15, Line 52, In Claim 62, change "a" to --in a--.

In Column 16, Line 62, In Claim 72, change "interfometrically" to --interferometrically--.

Signed and Sealed this
Twentieth Day of December, 2011

David J. Kappos
*Director of the United States Patent and Trademark Office*